INVENTOR.
LEON K. KIRCHMAYER.
ATTORNEY

INVENTOR.
LEON K. KIRCHMAYER.
BY
ATTORNEY.

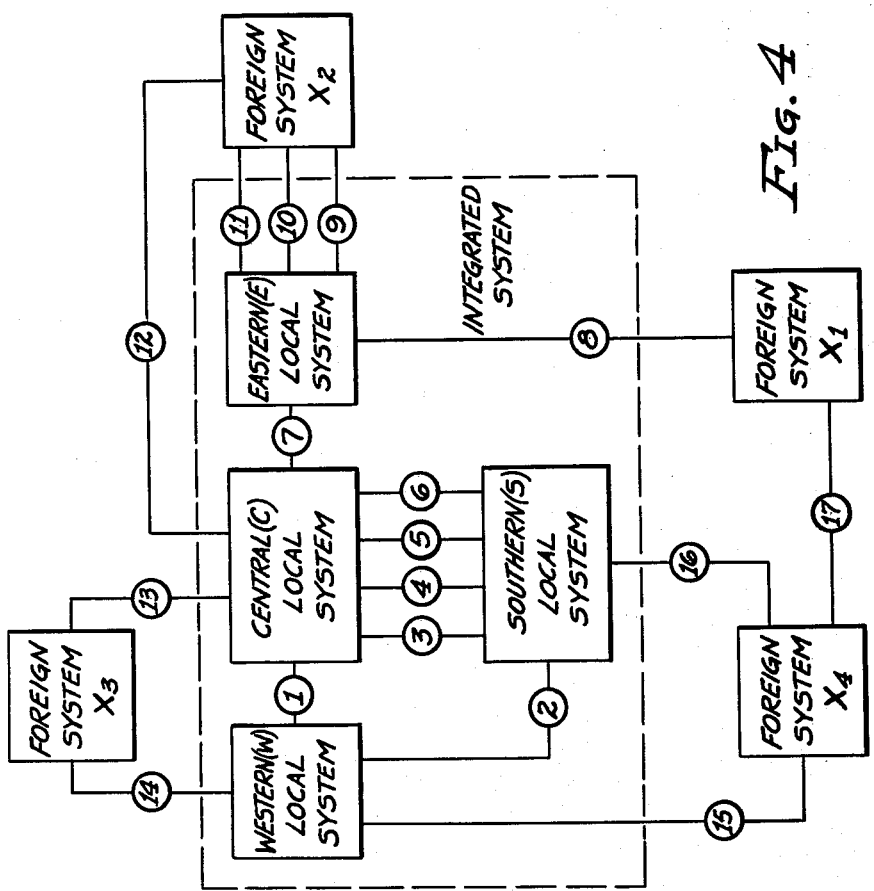
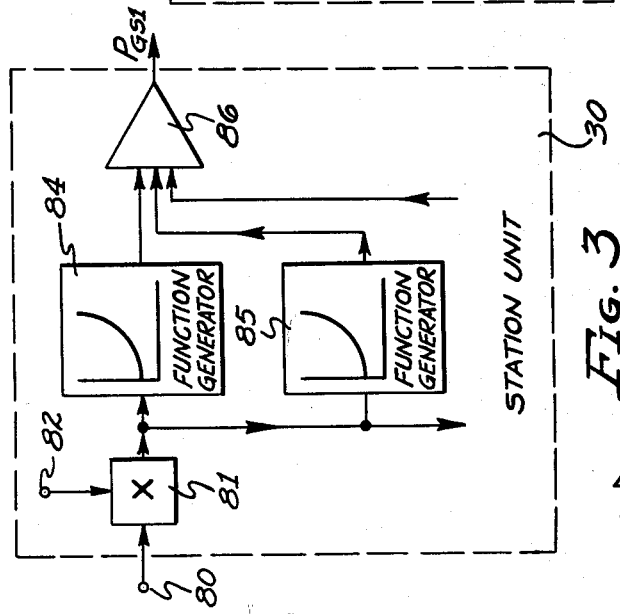

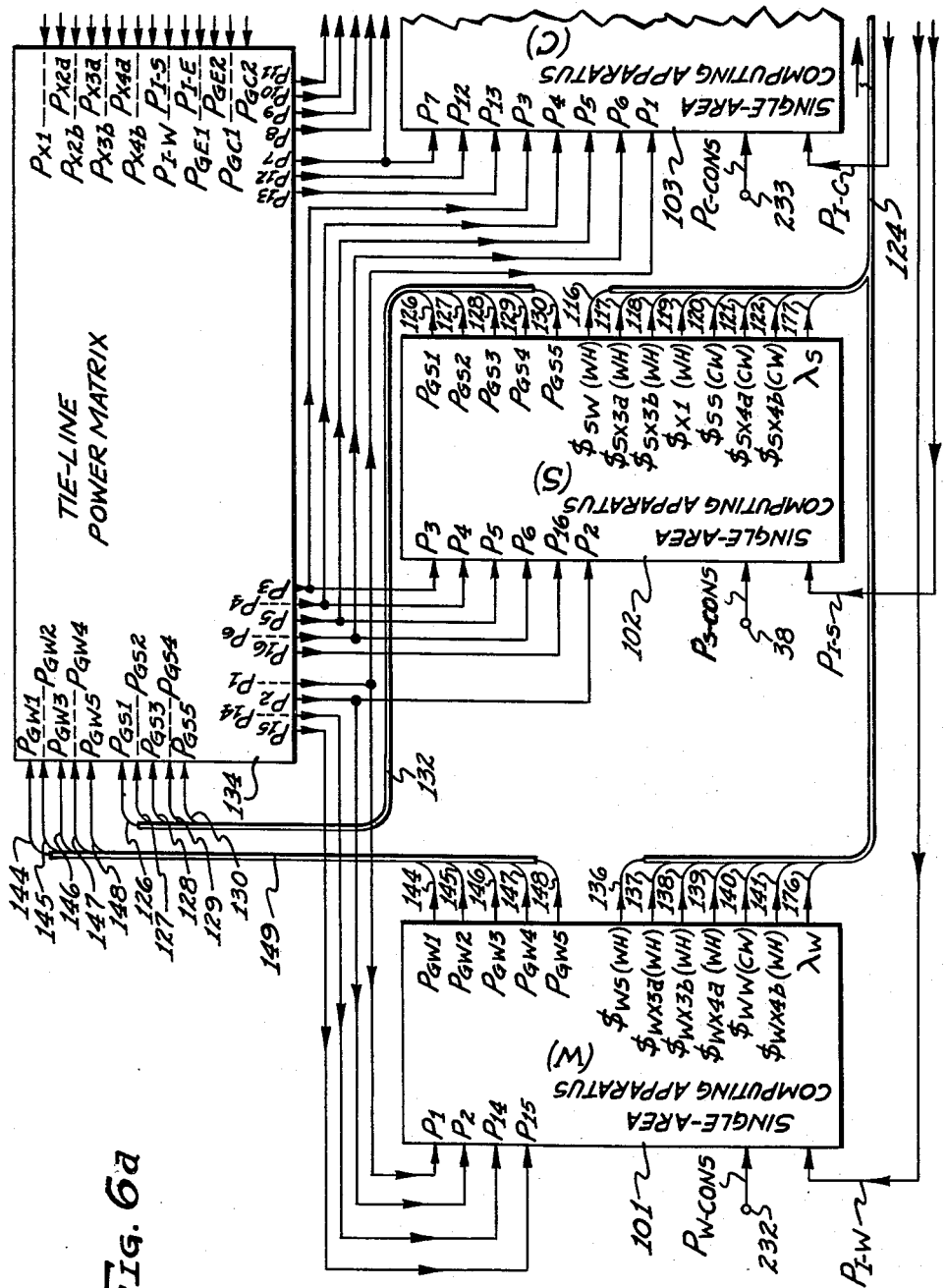

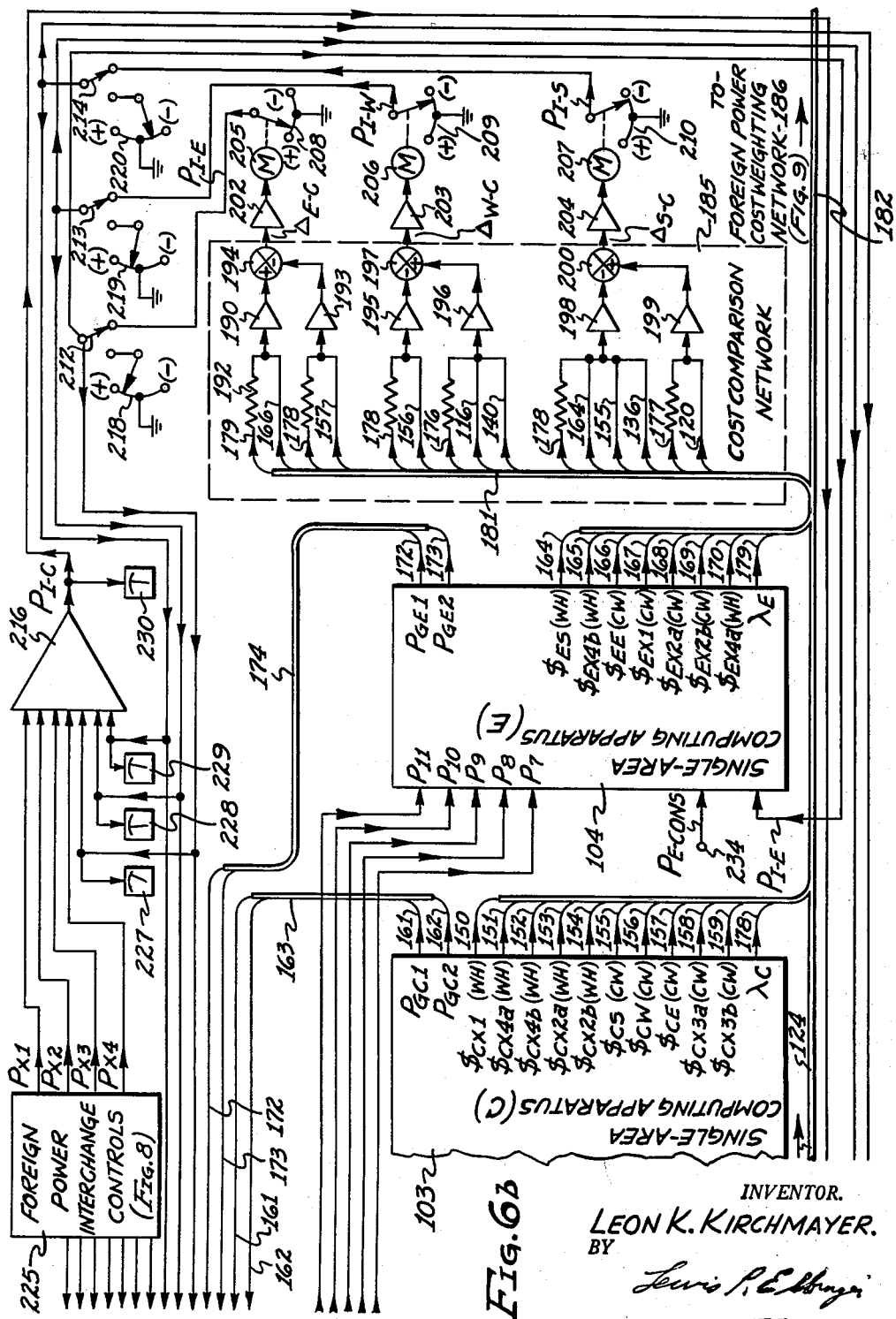

INVENTOR.
LEON K. KIRCHMAYER.
BY
ATTORNEY.

Jan. 7, 1964   L. K. KIRCHMAYER   3,117,221
ELECTRICAL POWER COMPUTER APPARATUS
Filed April 30, 1959   8 Sheets-Sheet 8

INVENTOR.
LEON K. KIRCHMAYER.
BY
ATTORNEY.

3,117,221
                                        Patented Jan. 7, 1964

3,117,221
ELECTRICAL POWER COMPUTER APPARATUS
Leon K. Kirchmayer, Scotia, N.Y., assignor to General
    Electric Company, a corporation of New York
            Filed Apr. 30, 1959, Ser. No. 810,062
                    10 Claims. (Cl. 235—185)

This invention relates to apparatus for computing the economic interchange of power between member systems of a power pool and more particularly to apparatus for computing the optimum amount of power to be delivered to each member system of a power pool by the other member systems while also computing the economic allocation of generation within each member system.

This application is a continuation-in-part of U.S. patent application 792,728, filed February 12, 1959, now abandoned.

The rapidly increasing demand for electrical energy has stimulated both an increase in the number of stations within power systems and the expansion of transmission networks for interconnecting many power systems. As stations have increased and networks have expanded, the problems of maintaining efficient power system operation and power interchange schedules have also increased.

Within each power system, it is no longer economically feasible to generate power at the side of the load. Instead, a modern power system comprises many generators and generating stations interconnected by a system power transmission network to transmit power to various load sites throughout the system. However, a penalty in the form of transmission line power losses is paid for transmission of power between geographically remote generators and loads. In maintaining an efficiently operating power system, these power transmission losses cannot be neglected; and, therefore, power companies today seek to improve their operating economy by including the effects of transmission losses when scheduling generator and generating station power allocations.

It is known that when a plurality of generating units are interconnected to supply a system load, maximum economy is achieved if the incremental cost of power received at the system load is the same for all generating units. For example, see L. K. Kirchmayer, "Economic Operation of Power Systems," chapter 5, John Wiley & Sons, Inc., New York, 1958. When the effects of transmission losses are included in preparing a system generation schedule for controlling the power to be supplied by each of the generating units so as to deliver the required power to the system load at a common incremental cost, the complex task normally prevents the dispatcher from manually maintaining the generation schedule current with changes in the system load. For example, most of the generators will deliver a particular value of power at different incremental costs, and this incremental cost for each generator increases as the generated power increases. Furthermore, a continuous determination must be made as to whether it is cheaper to send high-cost power a short distance or low-cost power a long distance. Therefore, to aid the dispatcher, computing systems are now available for computing the proper generation of each generating unit to satisfy system load requirements and to maintain a common incremental cost of power received at the system load. Such computing systems are described in U.S. Patent 2,839,692, issued in the name of L. K. Kirchmayer, and assigned to the assignee of the present invention.

Although the prior art contains descriptions of computing systems for determining the economic operation of generating units within a local power transmission system, it has been the practice heretofore to have neighboring power systems interchange power according to predetermined schedules. Thus, the computing systems of the aforementioned patent compute the economic generation schedule of the local system generating units so as to maintain the interchange power from other local systems at a preselected value.

A power transmission system wherein a plurality of local systems are interconnected to exchange power is hereinafter termed an "integrated power transmission system." Power may be transferred between a pair of local systems of an integrated power transmission system by direct transmission over tie lines connecting together the two local systems, by "wheeling" power through a third local system which serves to connect together the two local systems, or by a combination of these two transmission methods. Such an integrated power transmission system is most economically operated only when each local system can receive power from each of the other local systems thereof at the same incremental cost, and when this incremental cost is the same as the incremental cost of power received from the local generating units. In preparing an interchange schedule for an integrated power transmission system, consideration must also be given as to whether it is more economical for each local system to receive or to supply interchange power, recognizing the transmission losses involved. This schedule must also consider the common incremental cost of power of each local system and the effect that the receipt or supply of interchange power has on altering this common incremental cost. To prepare a schedule for determining the most economic generation of an integrated system is, therefore, a time-consuming task of great magnitude. If the schedule is computed manually, it must be prepared many hours ahead of its time of employment, and only predicted values of load can be economically satisfied. To maintain such a schedule current, so as to meet the actual and changing load conditions in the integrated system, is obviously impossible if only manual computation is to be employed. Therefore, an integrated power transmission system can only be kept continuously operating most economically by employing an automatic computing system, which will continuously consider the mass of data involved and continuously compute the required power generation schedule.

It is, therefore, the principal object of this invention to provide apparatus for automatically computing the power requirements of an integrated power transmission system.

Another object of this invention is to provide apparatus for automatically computing the interchange power requirements for most economical operation of an integrated power transmission system.

Another object of this invention is to provide apparatus for automatically computing the algebraic value of power received by each local power transmission system of an integrated power transmission system for most economical operation of the integrated system.

Another object of this invention is to provide apparatus for automatically computing the power generation of each local power transmission system of an integrated power transmission system for receipt of interchange power by each local system from the other local systems at a common incremental cost.

Another object of this invention is to provide apparatus for automatically computing the power generation of all generating units of an integrated power transmission system for receipt of power by each local system of said integrated system from the other local systems and from the local generating units at a common incremental cost.

Another object of this invention is to provide apparatus for automatically computing the interchange power requirements of an integrated power transmission system for most economical operation thereof, while also computing the corresponding economic allocation of generation within each local power transmission system.

Another object of this invention is to provide apparatus for automatically computing the power transferred on each of a plurality of transmission paths which connect a local power transmission system with at least one other local power transmission system.

Another object of this invention is to provide apparatus for automatically computing the power transferred on each of the plurality of transmission paths which interconnect the local power transmission systems of an integrated power transmission system.

Another object of this invention is to provide apparatus for automatically computing the incremental cost of power received at a predetermined location in an integrated power transmission system from a local power transmission system thereof when at least a portion of said power has been transmitted to said predetermined location through another local power transmission system.

Another object of this invention is to provide apparatus for automatically computing the incremental cost of losses for transmitting power through a local power transmission system of an integrated power transmission system when transferring power from one location to another in said integrated system.

Another object of this invention is to provide apparatus for automatically computing the incremental cost of power exchanged between an integrated transmission system and a power transmission system external thereto.

The foregoing objects are achieved by providing apparatus for generating signal pairs representing the incremental costs of power at predetermined locations in an integrated power transmission system for exchange of power by pairs of the $n$ local power transmission systems, and in response to differences between the two values of each signal pair, for computing the required change of generation of each of the local systems to equalize the values of the corresponding signal pair. A local computer of the type previously described is provided for computing for each local system the economic allocation of generation therein. Each of the local computers is responsive to a first signal representing the desired total power to be consumed in the corresponding local system and a second signal representing the algebraic value of power delivered to the local system by the other local systems of the integrated power transmission system, for computing the required power generataion by each of the local power sources to satisfy the local system load requirements and to deliver power to a predetermined location in the local system at a common incremental cost. A computing means for each one of $n-1$ different pairs of the local systems computes a pair of incremental costs of power at a corresponding predetermined location in the integrated system for a hypothetical exchange of an increment of power between the two systems of the pair, the computation of this cost pair being based on the two common incremental costs of the corresponding pair of local systems. A comparison means determines the difference between the values of each computed pair of incremental costs. In response to each of these differences, a signal generator adjusts the values of the corresponding aforementioned second signals in such a sense as to tend to reduce the magnitude of the difference.

Additional computing means responds to signals representing the power delivered by the individual generating stations of all of the local systems and to the signals representing the algebraic value of power delivered to each of said local systems by the other local systems for computing the power transmitted on each of the individual transmission paths of the integrated system. Wherever the aforementioned incremental cost of power delivered to a predetermined point is affected by power wheeled through a local system, additional computing means is provided to determine the contribution of the wheeling losses to this incremental cost. This latter type of computing means is responsive to the common incremental cost of power of the local system through which the power is wheeled and to the values of power transmitted on the transmission paths which transfer power into and out of this local system for computing the incremental cost of losses for wheeling power therethrough.

This invention will be described with reference to the accompanying drawings, wherein:

FIGURE 3 is a block diagram of a station unit useful in the local computer of FIG. 1;

FIGURE 4 is a map of the integrated power transmission system to be maintained in economic dispatch by the embodiment of this invention;

Figures 7, 8:
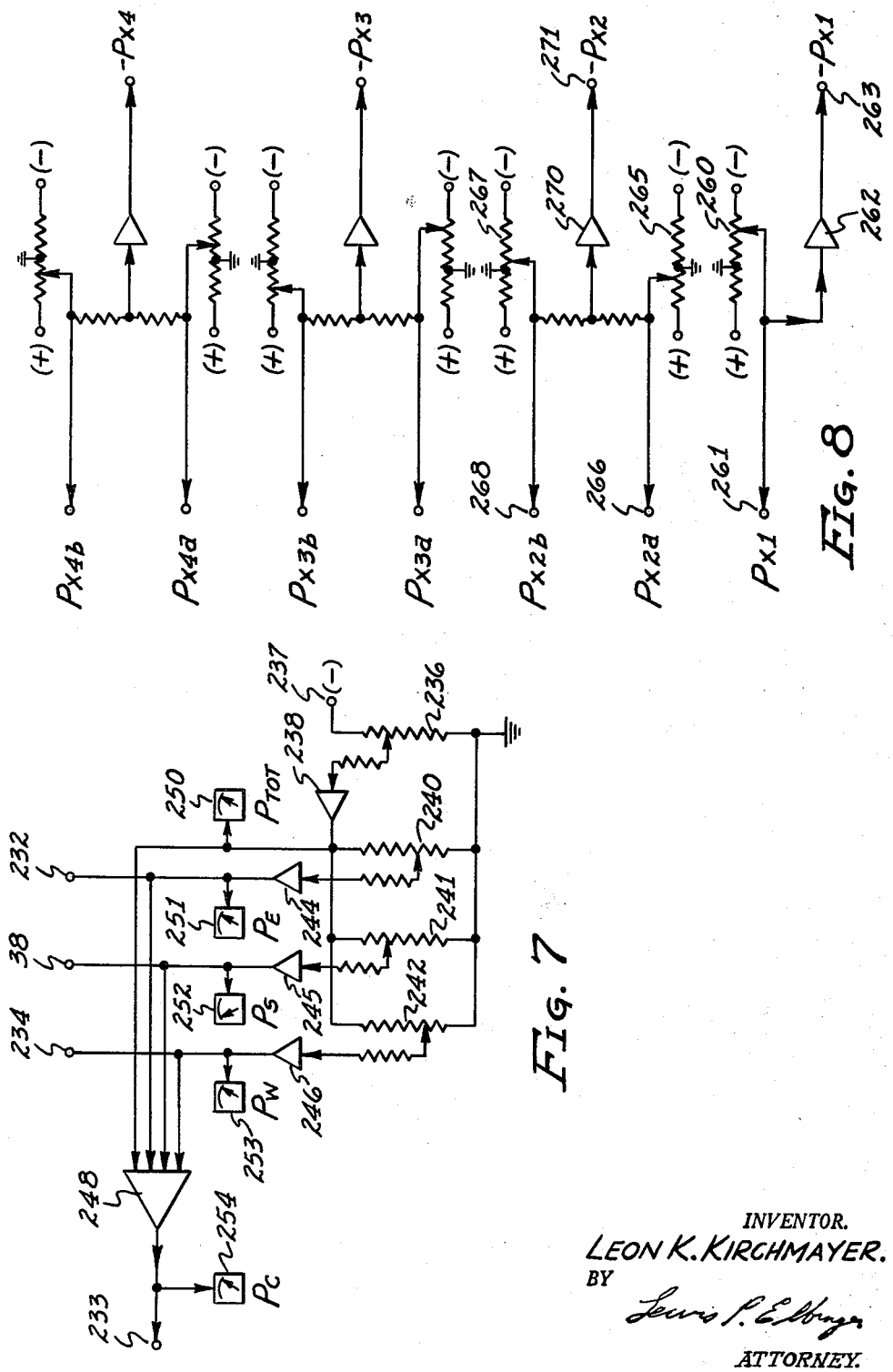
Figure 9:
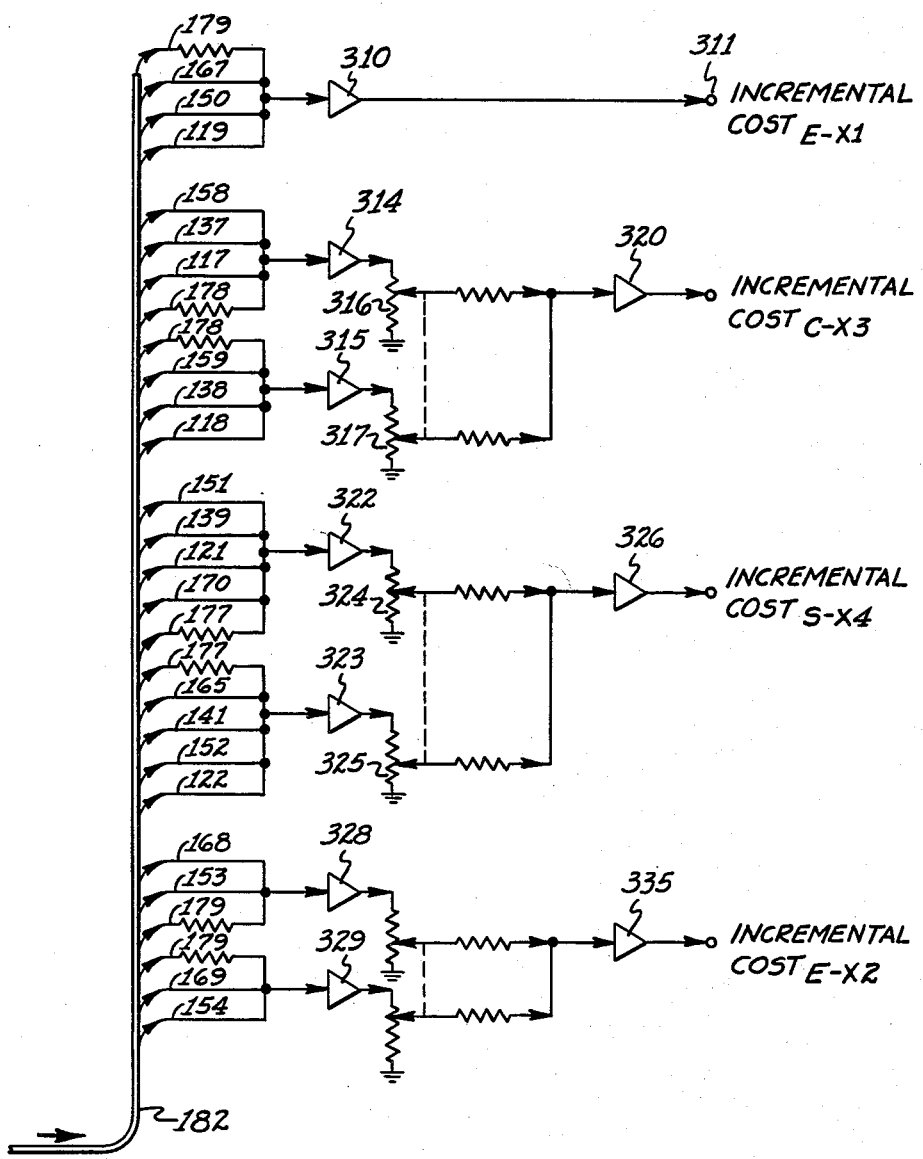

FIGURES 6a and 6b constitute a block diagram of an embodiment of this invention;

FIGURE 7 is a schematic diagram of the power consumption determination network for employment with the embodiment of FIG. 6;

FIGURE 8 is a schematic diagram of the foreign power interchange controls for employment with the embodiment of FIG. 6; and FIGURE 9 is a schematic diagram of the foreign power cost weighting network for employment with the embodiment of FIG. 6.

The integrated system computing apparatus of this invention determines the interchange power requirements of an integrated power transmission system for cost economical operation thereof, delivers signals representing the interchange power contribution required of each local power transmission system, and includes a local computer of the type described in the aforementioned Kirchmayer Patent 2,839,692 to compute for each local system, the economic allocation of generation therein. Local computers of this type are further described in chapter 6 of the aforementioned "Economic Operation of Power Systems" by L. K. Kirchmayer. Each local computer responds to a signal representing the desired total power to be consumed in the corresponding local system and a signal representing the required interchange power contribution of the local system, to calculate the required power generation of each power source of the local system to satisfy the power consumption and interchange contribution requirements while delivering power to a predetermined location in the corrresponding local system at a common incremental cost. Alterations of the interchange power requirements of the system are continuously calculated by the integrated system computing apparatus in response to changes in the common incremental costs determined by the local computers.

For a better understanding of the computing apparatus of this invention, a local computer useful in the embodiment thereof will be described.

Local Computer Theory

A local computer calculates the required power generation by each generating unit of the corresponding local power transmission system to satisfy the power consumption and interchange power contribution requirements thereof while delivering power to a predetermined location in the corresponding local system at a common incremental cost. The total required generation by all of the local system generating units is given by $$\sum_i P_{Gi} = P_R + P_L - P_I \quad (1)$$

where $P_{Gi}$ represents the power generated by the $i^{th}$ generating unit of the local system, $P_R$ represents the local system load requirements, $P_L$ represents the transmission losses in the local system, and $P_I$ represents the net, or algebraic, value of interchange power received by the local system from sources external thereto; such as other local systems of the integrated system.

For most economical operation of the local system to satisfy the power consumption and interchange power contribution requirements, the total cost of operation, $F_t$, of the local system (in dollars per hour) must be minimized. This total cost is a function of the power delivered by all local system generating units; i.e., $$\text{Total cost} = F_t(P_{G1}, P_{G2}, \ldots, P_{Gn}) \qquad (2)$$

Equation 1 represents a constraint on the independent variable determining the total cost of Equation 2, and may be rewritten as $$\psi = P_R + P_L - P_I - \sum_i P_{Gi} = 0 \qquad (3)$$

where $\psi$ represents the constraining equation.

It is known that where such a function, $F_t$, of $n$ variables which are related by a constraining equation, $\psi$, is to be minimized, the values of the variables which render this function a minimum may be determined by equating to zero the partial derivatives of the auxiliary function $$F = F_t + \lambda \psi \qquad (4)$$

wherein $\lambda$ is regarded as a constant. This is shown, for example, in E. Goursat and E. R. Hedrick, "Mathematical Analysis," vol. 1, Ginn and Company, New York, 1904, pp. 128 and 129.

Equating the partial derivatives of Equation 4 to zero there result, $$\frac{\partial F_t}{\partial P_{G1}} + \lambda\left(\frac{\partial P_L}{\partial P_{G1}} - 1\right) = 0$$

$$\frac{\partial F_t}{\partial P_{G2}} + \lambda\left(\frac{\partial P_L}{\partial P_{G2}} - 1\right) = 0$$

$$\cdot \quad \cdot \quad \cdot$$

$$\frac{\partial F_t}{\partial P_{Gn}} + \lambda\left(\frac{\partial P_L}{\partial P_{Gn}} - 1\right) = 0 \qquad (5)$$

Equations 5 may be rewritten as $$\frac{\partial F_t}{\partial P_{G1}} + \lambda \frac{\partial P_L}{\partial P_{G1}} = \lambda$$

$$\frac{\partial F_t}{\partial P_{G2}} + \lambda \frac{\partial P_L}{\partial P_{G2}} = \lambda$$

$$\cdot \quad \cdot \quad \cdot$$

$$\frac{\partial F_t}{\partial P_{Gn}} + \lambda \frac{\partial P_L}{\partial P_{Gn}} = \lambda \qquad (6)$$

where $\frac{\partial F_t}{\partial P_{Gi}}$ represents the incremental cost of power generation for generating unit $i$ in terms of, for example, dollars per megawatt-hour, $\frac{\partial P_L}{\partial P_{Gi}}$ represents the ratio of change in transmission losses in the local system to change in power of generating unit $i$ when delivering an increment of power from generating unit $i$ to the hypothetical load center of the local system, and $\lambda$ may be interpreted as the incremental cost of power received by the load center, in terms of dollars per megawatt-hour.

(The preceding equations and their interpretation may also be found in chapter 5 of the aforementioned "Economic Operation of Power Systems" by L. K. Kirchmayer.)

Equations 6, which are termed the intra-area coordination equations for the local system, specify that, for optimum economy, the incremental cost of received power at the load center of the local power transmission system should be the same for all generating units. Equations 6 describe the general mode of operation of the local computer shown in FIG. 1.

The total transmission losses of a local power transmission system may be given by $$P_L = \sum_m \sum_n P_m B_{mn} P_n \qquad (7)$$

where $P_m$, $P_n$ represent the source loadings the local system, such as the power supplied to the system load by generating units of the system and power transferred into the system on tie-lines, and $B_{mn}$ represents constants determined by the self and mutual impedances of the local system transmission network and the pattern of the loads on the network.

Equation 7 and methods for determining the values of $B_{mn}$ are described in the aforementioned "Economic Operation of Power Systems," by L. K. Kirchmayer, especially chapters 3, 4 and 5.

The ratio of change in transmission losses in the local system to change in power of a particular generating unit $i$, as defined above, is obtained by partially differentiating Equation 7 with respect to $P_{Gi}$, $$\frac{\partial P_L}{\partial P_{Gi}} = \sum_m 2B_{mGi}P_m + \sum_j \frac{\partial P_j}{\partial P_{Gi}} \sum_m 2P_m B_{mj} \qquad (8)$$

where $\frac{\partial P_j}{\partial P_{Gi}}$ represents the ratio of change in the $j^{th}$ tieline power flow to change in power of the $i^{th}$ generating station when delivering an increment of power from this $i^{th}$ generating station to the hypothetical load center of the local system.

Figure 1:
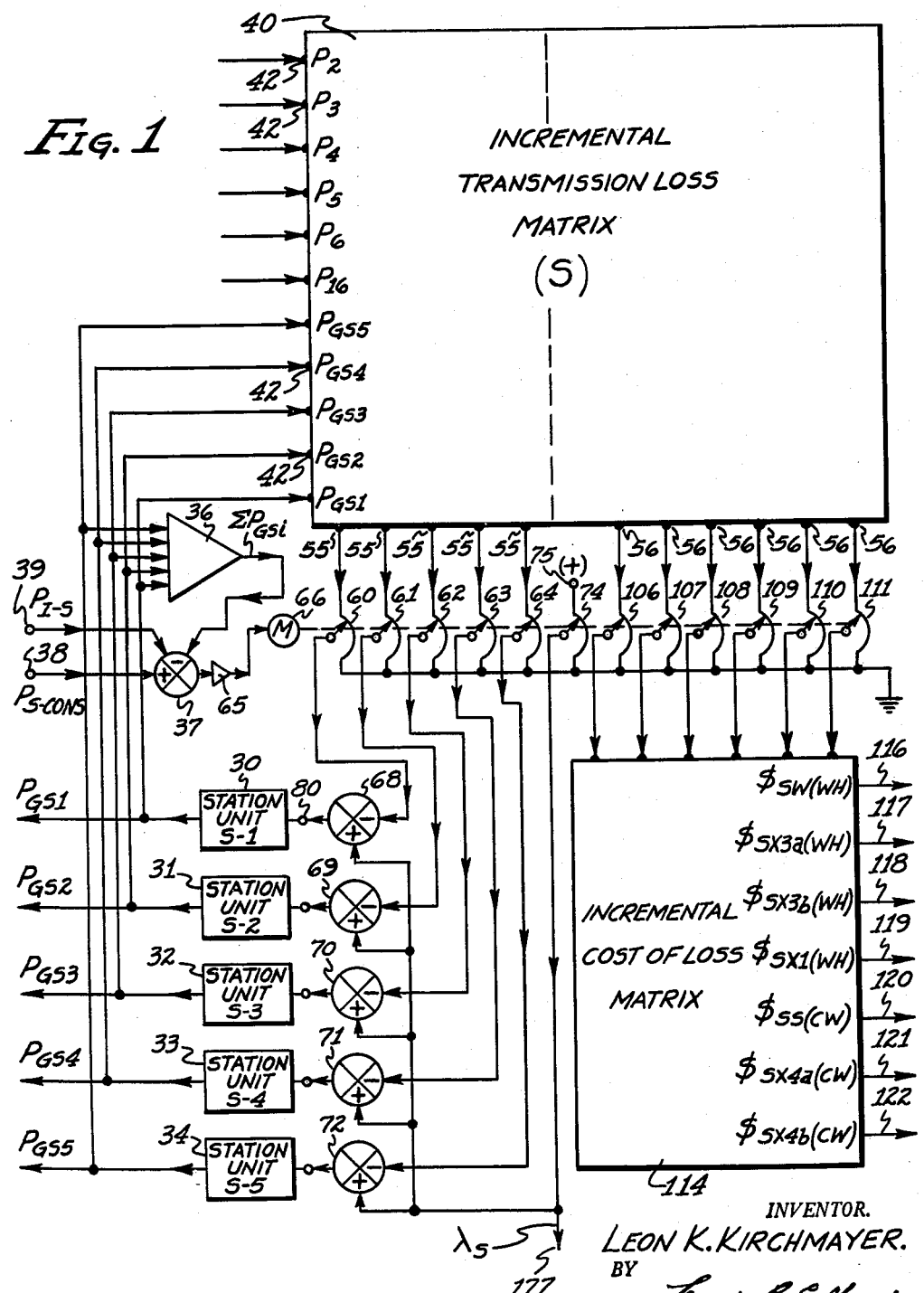
FIGURE 1 is a block diagram of a single-area computing apparatus useful in the embodiment of this invention.

In the local computer of FIG. 1, the incremental loss terms of Equation 8 that involve the terms $$\frac{\partial P_j}{\partial P_{Gi}}$$

may be neglected since they are usually small compared with the terms retained. Therefore, Equation 8 may be simplified as $$\frac{\partial P_L}{\partial P_{Gi}} \doteq \sum_m 2B_{mGi}P_m = \lambda \qquad (8a)$$

Substituting Equation 8a in Equation 6, there result:

$$\frac{\partial F_t}{\partial P_{G1}} + \lambda \sum_m 2B_{mG1}P_m = \lambda$$

$$\frac{\partial F_t}{\partial P_{G2}} + \lambda \sum_m 2B_{mG2}P_m = \lambda$$

$$\cdot \quad \cdot \quad \cdot$$

$$\frac{\partial F_t}{\partial P_{Gn}} + \lambda \sum_m 2B_{mGn}P_m = \lambda \qquad (9)$$

Equations 9 may be transposed to $$\frac{\partial F_t}{\partial P_{G1}} = \lambda - \lambda \sum_m 2B_{mG1}P_m$$

$$\frac{\partial F_t}{\partial P_{G2}} = \lambda - \lambda \sum_m 2B_{mG2}P_m$$

$$\cdot \quad \cdot \quad \cdot$$

$$\frac{\partial F_t}{\partial P_{Gn}} = \lambda - \lambda \sum_m 2B_{mGn}P_m \qquad (10)$$

Equations 10 describe the specific mode of operation of the local computer shown in FIG. 1.

Local Computer

The particular local computer of FIG. 1 is employed to compute the economic operation of a local power transmission system comprising five steam power generating stations, this local power transmission system being designated as the Southern (S) local power transmission system in the integrated power transmission to be hereinafter described. Each generating station comprises one or more generators. In the local computer of FIG. 1, station units 30, 31, 32, 33 and 34 are provided to represent respectively the five steam power generating stations of the Southern local system. Each of station units 30-34 delivers a signal representing the total power delivered by the corresponding generating station.

The output signal of station unit 30 is designated as $P_{GS1}$, of station unit 31 as $P_{GS2}$, etc. This designation identifies each of these signals as representing the power of a particular steam power generating station of the Southern local system. All of the output signals of station units 30-34 are applied to a summing amplifier 36, the output signal thereof representing the total power delivered by all the steam power generating stations of the local power transmission system. Summing amplifiers are well known in the art and, therefore, summing amplifier 36 may be of any conventional type. The output signal of summing amplifier 36 is applied to a differential amplifier 37. Differential amplifiers are also well known in the art and, therefore, differential amplifiers 37 may be of any conventional type. Examples of summing and differential amplifiers useful in the embodiment of this invention are described in G. A. Korn and T. M. Korn, "Electronic Analog Computers," McGraw-Hill Book Company, Inc., New York, 1952. Of course, it is not necessary specifically to employ a differential amplifier, but, instead, a summing amplifier may be provided with negative input signals to represent the quantities to be subtracted from applied quantities represented by positive input signals. However, for a clearer understanding of the invention the symbol of a differential amplifier is illustrated in FIG. 1.

A signal representing the desired total power to be consumed in the Southern system is applied to an input terminal 38, which is coupled to differential amplifier 37. The power consumption represented by the signal applied to terminal 38 includes the Southern system load requirements, designated $P_R$ in Equation 1, and the Southern system transmission losses, designated $P_L$ in Equation 1. A signal representing the algebraic value of power delivered to the Southern system by power sources external thereto is applied to an output terminal 39, which is coupled to differential amplifier 37. The signal applied to terminal 39 represents the interchange power contribution requirements of the Southern local system, designated $P_I$ in Equation 1. If the polarity of the signal is positive, the local system receives the interchange power quantity represented thereby; and if the polarity of the signal is negative, the local system transmits the interchange power quantity represented thereby. Differential amplifier 37 delivers an output signal representing the difference between the sum of the signals received from amplifier 36 and terminal 39 and the signal received from terminal 38. Thus, the output signal of differential amplifier 37 represents the central expression $$\left(P_R + P_L - P_I - \sum_i P_{Gi}\right)$$

of constraining Equation 3. Whenever this central expression deviates from zero, so that Equation 3 is not satisfied, differential amplifier 37 provides a corresponding output signal of proper polarity. Thus, when the required power consumption by the Southern system differs from the power supplied thereto (by local generating stations and external power sources) a corresponding error or difference signal is delivered by differential amplifier 37. The error signal of differential amplifier 37 is applied to a servo amplifier 65, the output signal thereof being applied to a servomotor 66.

The output signal of each of the station units 30-34 is applied to a respective row of a computing matrix 40. Also applied to respective rows of matrix 40 are signals representing the power transferred into the local system on the tie-line connected thereto. Computing matrix 40 is employed to provide signals representing respectively the ratio of change in transmission losses in the Southern system to change in power of a generating station for all of the Southern system generating stations. In matrix 40 the values of the signals representing the generating station powers and the tie-line powers are multiplied by the appropriate $B_{mn}$ quantities and related products are summed in accordance with Equation 8. Therefore, the specific computing matrix of FIG. 1 is identified as an incremental transmission loss matrix in accordance with the output signals provided thereby.

Figure 2:
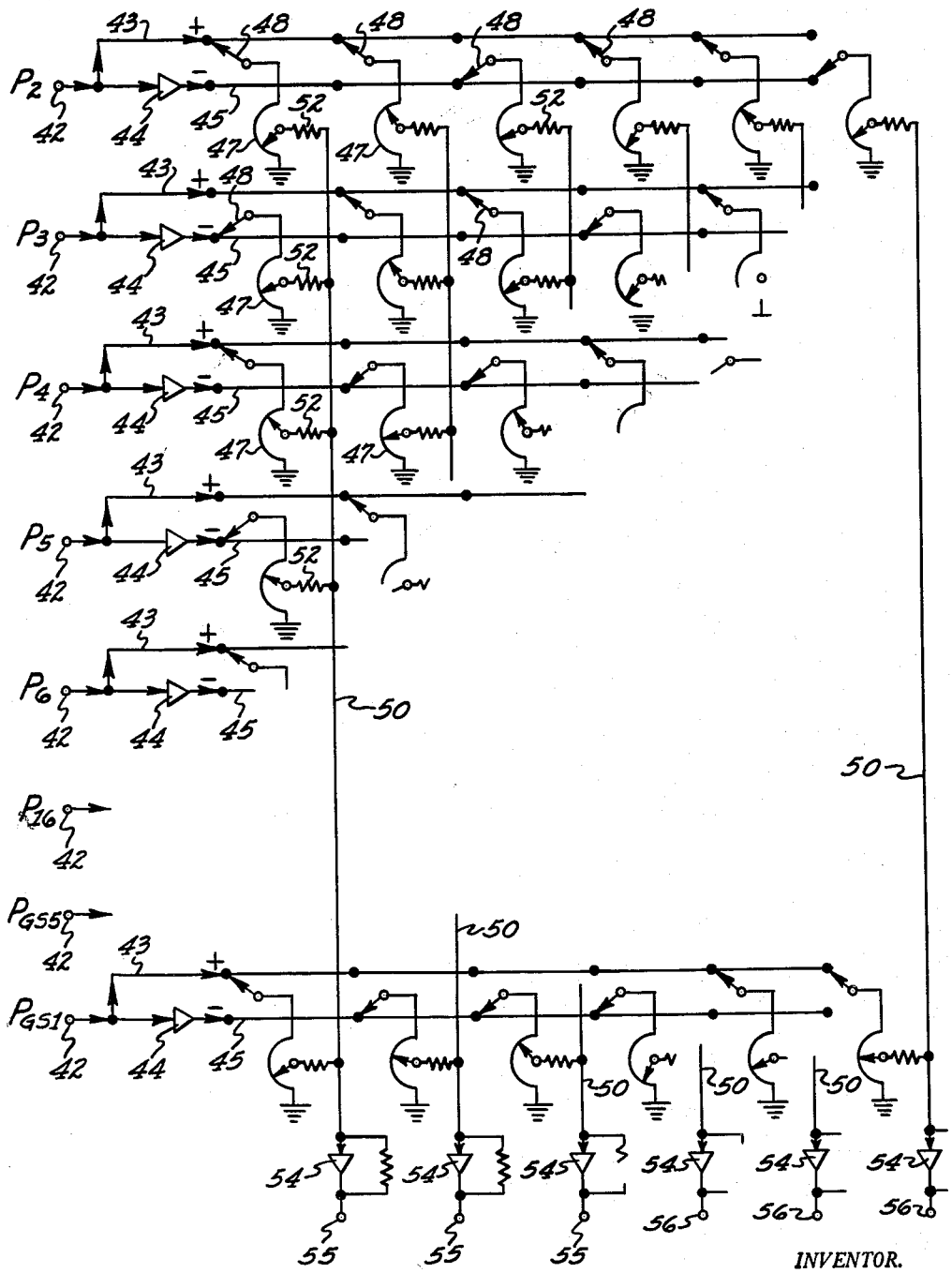
FIGURE 2 is a schematic diagram of a computing matrix useful in the embodiment of this invention.

Computing matrix 40 is shown in detail in FIG. 2. However, the matrix of FIG. 2 is useful for all computing matrices to be referred to hereinafter in this description. The computing matrix comprises a plurality of input rows, shown as horizontal leads, a plurality of output columns, shown as vertical leads, and a plurality of multiplying means, shown as potentiometers.

Each input signal is received at a respective input terminal 42 and applied directly to a corresponding positive lead 43. Each input signal is inverted by a corresponding inverting amplifier 44 and applied to the corresponding negative lead 45. A plurality of potentiometers 47 receive an input signal from a corresponding one of switches 48. Each one of potentiometers 47 and its corresponding switch 48 is preadjusted in accordance with the desired value of $B_{mn}$ to be represented. The values of $B_{mn}$ may be scaled to have magnitudes ranging from 0 to 1.0 and bear either a positive or a negative polarity designation. The magnitude of $B_{mn}$ is preadjusted by setting the position of the movable arm of the corresponding one of potentiometers 47. The corresponding polarity designation of $B_{mn}$ is preadjusted by setting the position of the corresponding one of switches 48. A switch 48 is set to receive a signal from the associated one of positive leads 43 if the polarity designation of the corresponding value of $B_{mn}$ is positive. A switch 48 is set to receive a signal from an associated negative lead 45 if the polarity designation of $B_{mn}$ is negative. Therefore, the association of signs "positive" and "negative" with leads 43 and 45 is not an indication of the polarity of the signal transferred on each lead, but is, instead, an indication of the polarity designations which may be provided by those switches 48 which are connected thereto.

A plurality of combining leads 50 are provided, the number of combining leads corresponding to the number of input signals delivered to the computing matrix. The specific drawing of FIG. 2 is shown merely for illustrative purposes and therefore does not show the complete structure of a particular computing matrix. Thus, neither all of the positive and negative leads, nor all of the combining leads are shown, but, instead, only a sufficient number of these leads are illustrated to demonstrate the principle of operation and construction of a computing matrix. A potentiometer 47 for each positive and negative lead pair is coupled to each one of combining leads 50. The movable arm of each potentiometer transfers a signal through a corresponding resistor 52 to the corresponding one of combining leads 50. Each one of combining leads 50 delivers the signals received thereby to a corresponding summing amplifier 54. Each summing amplifier 54 delivers an output signal representing the summation of the signals received by the corresponding combining lead 50 from the plurality of potentiometers 47 coupled thereto. A number of summing amplifiers 54 equal to the number of input signals representing the generating station powers are connected to corresponding ones of a plurality of output terminals 55. The output signals available at terminals 55 represent respectively the incremental transmission losses; i.e., the rate of change in transmission losses in the local transmission system, as indicated in Equation 8a. Thus, for the Southern system and computing matrix 40, five output terminals 55 are provided to deliver the respective signals representing these incremental transmission losses for the five generating stations of the Southern system.

Consider specifically the generation of the incremental transmission loss value for the first generating station of the Southern system. Equation 8a specifically written for this computation is $$\frac{\partial P_L}{\partial P_{GS1}} = \sum_m 2B_{mG1} P_m \qquad (11)$$

Inasmuch as there are five generating stations in the Southern system and six tie-lines are connected thereto, the summation of Equation 11 involves eleven terms. The eleven potentiometers 47 coupled to the corresponding combining lead 50 are adjusted for the corresponding one of the eleven values of $B_{mG1}$. The corresponding ones of switches 48 are connected to the associated positive lead 43 or negative lead 45 in accordance with the polarity designation of the corresponding $B_{mG1}$. Each input signal is multiplied in the corresponding one of these eleven potentiometers 47 by the value of $B_{mG1}$ represented thereby. The output signal of each of these eleven potentiometers represents the product of the particular value of $B_{mG1}$ and the value of power represented by the input signal received thereby. The output signals of these eleven potentiometers are algebraically added by the corresponding one of summing amplifiers 54, the output signal of which corresponds to the incremental transmission loss represented by Equation 11. Each one of summing amplifiers 54 has a gain of 2 to account for the factor of 2 in Equation 11.

A number of additional summing amplifiers 54 and corresponding output terminals 56 equal to the number of tie-lines connected to the local system are also shown in FIG. 2. For the Southern system, six terminals 56 are provided. The significance of the signals delivered at terminals 56 will be described hereinafter.

Only that portion of computing matrix 40 provided for delivering signals to output terminals 55 is considered part of the local computer. The entire computing matrix 40 is part of a "single-area computing apparatus" which comprises all elements of FIG. 1, and which will be described hereinafter. In FIG. 1, the portion of computting matrix 40 to the left of the vertical dotted line therethrough illustrates symbolically that portion ascribed to the local computer. The complete local computer is that portion of FIG. 1 necessary only to compute the required power generation by each power source of the local power transmission system.

Referring once more to FIG. 1, the signal delivered by each one of output terminals 55 is applied to a respective one of potentiometers 60, 61, 62, 63 and 64. The movable arms of each of potentiometers 60-64 are mechanically ganged together and positioned by a servomotor 66. Each of potentiometers 60-64 is adapted to multiply the value of the signal received from the corresponding one of terminals 55 by the common incremental cost of received power of the Southern system; namely, $\lambda_S$. Thus, the like positions of the movable arms of potentiometers 60-64 correspond to the value of $\lambda_S$. Each output signal delivered by the movable arm of one of potentiometers 60-64 represents the incremental cost of transmission losses in the local system (i.e., dollars per megawatt-hour) for the corresponding generating station, the cost being based on the common incremental cost of power, $\lambda_S$, of the Southern system. Therefore, these incremental transmission losses are charged at the common incremental cost of received power of the Southern system. The movable arms of potentiometers 60-64 are connected respectively to differential amplifiers 68, 69, 70, 71, and 72 and apply thereto the corresponding incremental cost of transmission loss signal. The value of each of these output signals is given by the last term of the corresponding one of Equations 10.

A potentiometer 74, whose movable arm is also mechanically ganged with the movable arms of potentiometers 60-64 delivers an output signal, the amplitude of which is proportional only to the position of the movable arm. A fixed direct voltage is coupled to the input terminal 75 of potentiometer 74. Since the position of the movable arm of potentiometer 74 corresponds to $\lambda_S$, the output signal delivered by the movable arm of potentiometer 74 represents this common incremental cost of received power; that is, $\lambda_S$. The output signal of potentiometer 74 is applied to each of differential amplifiers 68-72.

Each of differential amplifiers 68-72 is adapted to subtract the value of the output signal of the corresponding one of potentiometers 60-64 from the value of the output signal of potentiometer 74. The output signals of differential amplifiers 68-72 are given by the corresponding ones of Equations 10, and represent, therefore, the incremental cost of power generation for the corresponding generating station of the Southern system.

The output signals of differential amplifiers 68-72 are applied to respective ones of station units 30-34. Each of station units 30-34 responds to its input signal, which represents the incremental cost of power generation of the corresponding generating station, to deliver an output signal, as described heretofore, which represents the total power generation of the corresponding generating station.

A station unit of the type shown in FIG. 3 is useful in the apparatus of FIG. 1. The signal applied to an input terminal 80 of the station unit represents the incremental cost of power generation of the generating station represented thereby, this signal being generated in accordance with Equations 10. The signal at terminal 80 is applied to a multiplier 81. Devices for multiplying two signals are well known in the art and they may comprise, for example, the previously described potentiometer multipliers or one of the multipliers described in chapter 6 of the aforementioned "Electronic Analog Computers," by Korn and Korn. Applied to an input terminal 82 is a signal representing the inverse of the fuel cost for the corresponding generating station. The fuel cost is a predetermined quantity and its inverse is usually manually set into the station unit, as by adjustment of a potentiometer, not shown. Dividing the incremental cost of power generation by the cost of fuel gives the incremental fuel rate. For example, if the signal applied to terminal 80 represents the incremental cost of power generation in units of dollars per megawatt-hour and the signal applied to terminal 82 represents the inverse of the fuel cost in terms of B.t.u.'s per dollar, the output signal delivered by multiplier 81 represents B.t.u.'s per megawatt-hour. For any given electrical power output, the incremental fuel rate is the ratio of the small change in fuel input to the corresponding small change in electrical power output. For steam generating stations, this incremental fuel rate uniquely determines the output power of a particular steam turbine-generator boiler unit. A curve of incremental fuel rate vs. power output may be termed an incremental fuel rate characteristic and is different for different generators. Such a curve is illustrated and explained in chapter 2 of the aforementioned "Economic Operation of Power Systems," by L. K. Kirchmayer.

The output signal of multiplier 81 is applied to a plurality of function generators, such as function generators 84 and 85, each function generator representing the particular incremental fuel rate characteristic of a generator of the corresponding generating station. Function generators for providing an output voltage as a particular function of an input voltage are well known in the art and are described, for example, in chapter 6 of the aforementioned publication, "Electronic Analog Computers," by Korn and Korn. Although the input signals to each of the function generators of a given station unit represent the same value of incremental fuel rate, the output signals provided by the function generators will usually represent different values of powers because of the differing characteristics of the generators.

The output signals of all function generators of the station unit are applied to a summing amplifier 86, the output signal of which is the output signal of the station unit and represents the total power generation of the generating station represented by that station unit.

Thus, as heretofore described, the local computer of FIG. 1 comprises a computing matrix for receiving input signals representing power from all sources for consumption by the local system load and in response to these input signals for providing output signals representing the incremental transmission losses in the local system for changes of power of each of the generating stations thereof; a multiplying means and a differential amplifier for each of these output signals to provide corresponding signals representing the incremental cost of power generation for each local generating station; and a station unit for each generating station responsive to the signals representing the incremental cost of power generation thereof for providing a signal representing the total power generated by that station. The local computer further comprises a summing amplifier responsive to all signals delivered by the station units for providing a signal representing the total local generation of the local system; a differential amplifier for providing a corresponding output signal whenever the required power consumption of the local system differs from the total power available both from the local generating stations and from interchange sources; and a servo system responsive to the output of the differential amplifier for adjusting the signal representing the common incremental cost of received power in the local system.

Thus, the local computer of this invention comprises a servomechanism of a type as described, for example, in fundamental form on page 64 of the aforementioned "Electronic Analog Computers," by Korn and Korn, and in chapter 2 of B. K. Ledgerwood, "Control Engineering Manual." This servomechanism is adapted to adjust the signals representing the total available power in the local system so that they remain equal to the input signals representing the required power consumption of the local system. Whenever the required power consumption signal applied to differential amplifier 37 deviates from the total of the power available signals applied to differential amplifier 37, an error signal representing the deviation is applied to servo amplifier 65. Servo amplifier 65 in turn supplies appropriate power to rotate servomotor 66 in a direction adapted to alter the local computer signals to reduce the magnitude of this deviation. Rotation of servomotor 66 alters the value of the local system λ and, consequently, the incremental cost of power generation signal of each generating station. Each station unit responds to the corresponding altered incremental cost of power generation signal to change its total power output signal. The sum of the total power output signals of the station units as applied to differential amplifier 37 through summing amplifier 36 reduces the aforementioned deviation. The error signal delivered by differential amplifier 37 continues to diminish as the available power signals change to meet the power consumption requirement signals.

Although a specific form of local computer has been shown in FIG. 1, the embodiment of this invention is not limited to this particular type of computer, but instead any computing system may be used which responds to a signal representing the desired total power to be consumed in the corresponding local system and a signal representing the algebraic value of power delivered to the local system by power sources external thereto for computing the required power generation by each of the power sources of the corresponding local system to satisfy the power consumption requirement and to deliver power to a predetermined location in the local system at a common incremental cost.

*Concepts of Integrated System Computer*

For a better understanding of the embodiment of this invention to be described hereinafter, the concepts and theory thereof will now be explained. As has been previously stated, an integrated power transmission system is most economically operated when each local system of the integrated system receives power from each of the other local systems thereof at the same incremental cost, and when this incremental cost is the same as the incremental cost of power received from the local generating stations. An integrated system so operated is said to be, for purposes of this description, in "economic dispatch." Thus, it is a function of the integrated system computer of this invention to calculate the interchange power requirements of each local power transmission system of the integrated system to maintain the integrated system in economic dispatch.

The particular embodiment of the integrated system computer to be described herein is adapted to calculate the necessary generation schedule to maintain in economic dispatch an integrated power transmission system formed by the generating stations of the Niagara Mohawk Power Corp. and the New York State Electric and Gas Corp. A simplified map of the integrated system is shown in FIG. 4. The Niagara Mohawk Power Corp. comprises three local power transmission systems designated respectively as the Western, Central and Eastern systems. The New York State Electric and Gas Corp. is located geographically south of the Niagara Mohawk Power Corp. and is designated, for simplicity, as the Southern local power transmission system. The integrated system of FIG. 4, therefore, comprises four local power transmission systems interconnected to exchange power.

The individual tie-lines, or transmission paths, of the integrated system are numbered for purposes of identification. Thus, tie-line 1 directly connects together the Western and Central systems, tie-line 2 directly connects together the Western and Southern systems, tie-lines 3, 4, 5 and 6 directly connect together the Southern and Central systems, and tie-line 7 directly connects together the Eastern and Central systems.

The integrated system of FIG. 4 is adapted to exchange power with transmission systems external thereto. Transmission systems external to the integrated system are designated as foreign systems $X_1$, $X_2$, $X_3$ and $X_4$. Power exchange with these foreign systems is not directly calculated by the integrated system computer, but the computer does provide pertinent cost information required for the determination of the economical foreign power exchange. Therefore, these foreign systems are not considered part of the integrated system. Tie-lines are also shown for interconnecting the integrated system with the foreign systems. For example, tie-line 8 directly connects the Eastern system with foreign system $X_1$ and tie-line 15 directly connects the Western system with foreign system $X_4$. One other tie-line, which plays a significant part in maintaining the integrated system in economic dispatch, is also shown in FIG. 4; that is, tie-line 17, which directly connects foreign systems $X_1$ and $X_4$.

Consider, now, an integrated power transmission system comprising $n$ local power transmission systems. For each local system it is necessary that the load requirements thereof be satisfied. The equation relating the required and available powers of a local system is the constraining equation. The $n$ constraining equations for the integrated system are $$\psi_a = P_{Ra} + P_{La} - P_{Ia} - \sum_i P_{Gai} = 0$$

$$\psi_b = P_{Rb} + P_{Lb} - P_{Ib} - \sum_i P_{Gbi} = 0$$

$$\cdot \quad \cdot \quad \cdot \quad \cdot \quad \cdot \quad \cdot$$

$$\psi_n = P_{Rn} + P_{Ln} - P_{In} - \sum_i P_{Gni} = 0$$

(12)

where $\psi_k$ represents the constraining equation of the $k^{th}$ local system, $P_{Rk}$ represents the load requirements of the $k^{th}$ local system, $P_{Lk}$ represents the transmission losses in the $k^{th}$ local system, $P_{Ik}$ represents the net, or algebraic, value of interchange power received by the $k^{th}$ local system from the other $n-1$ local systems of the integrated system and from the foreign systems, and $\sum_i P_{Gki}$ represents the total generation required of all generating stations of the $k^{th}$ local system.

In Equations 12 only $n-1$ of the $P_{IK}$ terms are independent variables and the remaining $P_{Ik}$ term is dependent, so that any one of the $P_{Ik}$ terms may be expressed as a function of the other $n-1$ terms, as follows $$P_{In} = -P_{Ia} - P_{Ib} - \ldots - P_{I,n-1} \quad (13)$$

The total cost of power generation of the system is a function of the power delivered by all generating units of all local systems and may be expressed as $$\text{Total cost } (F_T) = F_{ta} + F_{tb} + \ldots + F_{tn} \quad (14)$$

where $F_{tk}$ represents the total cost of the generation of all generating stations of the $k^{th}$ local system.

It is known that where such a function $F_T$ of a plurality of variables, which are connected by a number of distinct constraining equations, is to be minimized, the values of the variables which render this function a minimum may be determined by equating to zero the partial derivatives of the auxiliary function $$\mathscr{L} = F_T + \lambda_a \psi_a + \lambda_b \psi_b + \ldots + \lambda_n \psi_n \quad (15)$$

wherein $\lambda_a, \lambda_b, \ldots \lambda_n$ are regarded as constants. This is shown, for example, in the aforementioned "Mathematical Analysis" by Goursat and Hedrick.

Equating the partial derivatives of Equation 15 to zero, there result $$\frac{\partial F_T}{\partial P_{Gai}} + \lambda_a \frac{\partial \psi_a}{\partial P_{Gai}} + \lambda_b \frac{\partial \psi_b}{\partial P_{Gai}} + \ldots + \lambda_n \frac{\partial \psi_n}{\partial P_{Gai}} = 0$$

$$\frac{\partial F_T}{\partial P_{Gbi}} + \lambda_a \frac{\partial \psi_a}{\partial P_{Gbi}} + \lambda_b \frac{\partial \psi_b}{\partial P_{Gbi}} + \ldots + \lambda_n \frac{\partial \psi_n}{\partial P_{Gbi}} = 0$$

$$\cdot \quad \cdot \quad \cdot \quad \cdot \quad \cdot$$

$$\frac{\partial F_T}{\partial P_{Gni}} + \lambda_a \frac{\partial \psi_a}{\partial P_{Gni}} + \lambda_b \frac{\partial \psi_a}{\partial P_{Gni}} + \ldots + \lambda_n \frac{\partial \psi_n}{\partial P_{Gni}} = 0$$

(16)

and $$\frac{\partial F_T}{\partial P_{Ia}} + \lambda_a \frac{\partial \psi_a}{\partial P_{Ia}} + \lambda_b \frac{\partial \psi_b}{\partial P_{Ia}} + \ldots + \lambda_n \frac{\partial \psi_n}{\partial P_{Ia}} = 0$$

$$\frac{\partial F_T}{\partial P_{Ia}} + \lambda_a \frac{\partial \psi_a}{\partial P_{Ib}} + \lambda_b \frac{\partial \psi_b}{\partial P_{Ib}} + \ldots + \lambda_n \frac{\partial \psi_n}{\partial P_{Ib}} = 0$$

$$\cdot \quad \cdot \quad \cdot \quad \cdot \quad \cdot$$

$$\frac{\partial F_T}{\partial P_{I,n-1}} + \lambda_a \frac{\partial \psi_a}{\partial P_{I,n-1}} + \lambda_b \frac{\partial \psi_b}{\partial P_{I,n-1}} + \ldots + \lambda_n \frac{\partial \psi_n}{\partial P_{I,n-1}} = 0$$

(17)

Substituting the expressions for $\psi_k$ of Equations 12 in Equations 16, there result, $$\frac{dF_{ta}}{dP_{Gai}} + \lambda_a \frac{\partial P_{La}}{\partial P_{Gai}} + \lambda_b \frac{\partial P_{Lb}}{\partial P_{Gai}} + \ldots + \lambda_n \frac{\partial P_{Ln}}{\partial P_{Gai}} - \lambda_a = 0$$

$$\frac{dF_{tb}}{\partial P_{Gbi}} + \lambda_a \frac{\partial P_{La}}{\partial P_{Gbi}} + \lambda_b \frac{\partial P_{Lb}}{\partial P_{Gbi}} + \ldots + \lambda_n \frac{\partial P_{Ln}}{\partial P_{Gbi}} - \lambda_b = 0$$

$$\cdot \quad \cdot \quad \cdot \quad \cdot$$

$$\frac{dF_{tn}}{\partial P_{Gni}} + \lambda_a \frac{\partial P_{La}}{\partial P_{Gni}} + \lambda_b \frac{\partial P_{Lb}}{\partial P_{Gni}} + \ldots + \lambda_n \frac{\partial P_{Ln}}{\partial P_{Gni}} - \lambda_n = 0$$

(18)

Substituting the expression for $P_{In}$ of Equation 13 in the last of Equations 12, and then substituting the expressions for $\psi_k$ of Equations 12 in Equations 17, there result, $$\lambda_a \frac{\partial P_{La}}{\partial P_{Ia}} + \lambda_b \frac{\partial P_{Lb}}{\partial P_{Ia}} + \ldots + \lambda_n \frac{\partial P_{Ln}}{\partial P_{Ia}} - \lambda_a + \lambda_n = 0$$

$$\lambda_a \frac{\partial P_{La}}{\partial P_{Ib}} + \lambda_b \frac{\partial P_{Lb}}{\partial P_{Ib}} + \ldots + \lambda_n \frac{\partial P_{Ln}}{\partial P_{Ib}} - \lambda_b + \lambda_n = 0$$

$$\cdot \quad \cdot \quad \cdot \quad \cdot$$

$$\lambda_a \frac{\partial P_{La}}{\partial P_{I,n-1}} + \lambda_b \frac{\partial P_{Lb}}{\partial P_{I,n-1}} + \ldots + \lambda_n \frac{\partial P_{Ln}}{\partial P_{I,n-1}} - \lambda_{n-1} + \lambda_n = 0$$

(19)

where $\frac{\partial F_{ta}}{\partial P_{Gai}}$, for example, represents the incremental cost of power generation for the $i^{th}$ generating station of the $a^{th}$ local system, $\frac{\partial P_{La}}{\partial P_{Gai}}$, for example, represents the ratio of change in transmission losses in the $a^{th}$ local system to change in power of the $i^{th}$ generating station thereof when delivering an increment of power from this $i^{th}$ generating station to the hypothetical load center of the $a^{th}$ local system, $\frac{\partial P_{Lb}}{\partial P_{Gai}}$, for example, represents the ratio of change in transmission losses in the $b^{th}$ local system to change in power of the $i^{th}$ generating station of the $a^{th}$ local system when delivering an increment of power from the $i^{th}$ generating station of the $a^{th}$ local system to the hypothetical load center of the $a^{th}$ local system, and $\lambda_a$, for example, may be interpreted as the incremental cost of power received by the load center of the $a^{th}$ local system, $\frac{\partial P_{La}}{\partial P_{Ia}}$, for example represents the ratio of change in transmission losses in the $a^{th}$ local system to change in interchange power received by the $a^{th}$ local system when the $a^{th}$ local system receives an additional increment of interchange power, and $\frac{\partial P_{Lb}}{\partial P_{Ia}}$, for example, represents the ratio of change in transmission losses in the $b^{th}$ local system to change in interchange power received by the $a^{th}$ local system, when the $a^{th}$ local system receives an additional increment of interchange power.

In developing Equations 19, $P_{In}$ has been treated as the dependent variable, as in Equations 13.

It is to be noted that the first of Equations 18 represents, in shorthand form, a plurality of equations, there being one of these equations for each generating station of the $a^{th}$ local system. Similarly, the number of equations represented by the second and each remaining equation of Equations 18 corresponds to the number of generating stations in the corresponding local system. For example, if the $b^{th}$ local system has six generating stations, the second of Equations 18 would actually represent six equations, one for each generating station of the $b^{th}$ local system.

Although rigorous Equations 18 may be implemented by an integrated system computer, the cost and complexity of such a computer may be considerably reduced by dropping quantities in Equations 18 that are very small compared to other terms therein. It may be shown, for example, in the first of Equations 18 that the sum of the terms, such as $$\lambda_b \frac{\partial P_{Lb}}{\partial P_{Gai}}$$

which represent the incremental cost of transmission losses in a particular local system when there is a change in power by a generating station of a different local system, is approximately equal and opposite to the portion of the term $$\lambda_a \frac{\partial P_{La}}{\partial P_{Gai}}$$

that involves the incremental changes in tie-line power flows; i.e., see Equation 8. Therefore terms such as these may be dropped from Equations 18, which are then written as $$\frac{dF_{ta}}{dP_{Gai}} + \lambda_a \frac{\partial P_{La}}{\partial P_{Gai}} = \lambda_a$$

$$\frac{dF_{tb}}{dP_{Gbi}} + \lambda_b \frac{\partial P_{Lb}}{\partial P_{Gbi}} = \lambda_b$$

$$\vdots$$

$$\frac{dF_{tn}}{dP_{Gni}} + \lambda_n \frac{\partial P_{Ln}}{\partial P_{Gni}} = \lambda_n$$

(20)

wherein the incremental transmission loss terms, such as $$\frac{\partial P_{Lai}}{\partial P_{Ga}}$$

are given by Equation 8a.

Equations 20 are, therefore, similar in form to Equations 6, which describe the operation of the local computer of FIG. 1. Therefore, an additional advantage of employing simplified Equations 20 in the integrated system computer is that each local computer portion thereof need receive no signals from other local computers to compute the local system generation requirements. For example, a local computer for the $a^{th}$ local system, as described by the first of Equations 18 must receive signals representing incremental transmission losses in each of the $b^{th}$ to $n^{th}$ local systems from the corresponding local computers, whereas a local computer described by the first of Equations 20 need receive signals representing incremental transmission losses from no other local computers.

Equations 20 are termed the intra-area coordination equations of the integrated system. Each intra-area equation is concerned with the incremental transmission losses and incremental costs of power of only the corresponding local system. Equations 19 are termed the inter-area coordinated equations for the integrated system. Each inter-area equation is concerned with incremental transmission losses and incremental costs of power throughout the integrated system.

Equations 19 may be rewritten as $$\lambda_a - \lambda_a \frac{\partial P_{La}}{\partial P_{Ia}} - \lambda_b \frac{\partial P_{Lb}}{\partial P_{Ia}} - \cdots - \lambda_{n-1} \frac{\partial P_{L,n-1}}{\partial P_{Ia}} - \lambda_n \frac{\partial P_{Ln}}{\partial P_{Ia}} = \lambda_n$$

$$-\lambda_a \frac{\partial P_{La}}{\partial P_{Ib}} + \lambda_b - \lambda_b \frac{\partial P_{Lb}}{\partial P_{Ib}} - \cdots - \lambda_{n-1} \frac{\partial P_{L,n-1}}{\partial P_{Ib}} - \lambda_n \frac{\partial P_{Ln}}{\partial P_{Ib}} = \lambda_n$$

$$\vdots$$

$$-\lambda_a \frac{\partial P_{La}}{\partial P_{I,n-1}} - \lambda_b \frac{\partial P_{Lb}}{\partial P_{I,n-1}} - \cdots + \lambda_{n-1} - \lambda_{n-1} \frac{\partial P_{L,n-1}}{\partial P_{I,n-1}} - \lambda_n \frac{\partial P_{Ln}}{\partial P_{I,n-1}} = \lambda_n$$

(21)

Inter-area coordination Equations 21 may be interpreted as follows. Assume, on one hand, that each local system, except the $n^{th}$ local system, receives an additional increment of interchange power. All of these increments of interchange power must, therefore, be supplied by the $n^{th}$ local system. Under these conditions, Equations 21 specify that for each local system to receive interchange power at the same incremental cost as it is receiving power from its local generating stations, the incremental cost of this interchange power as transmitted at the $n^{th}$ local system must be the same as the incremental cost of power received by the load center of the $n^{th}$ local system from its local generating stations. Assume, on the other hand, that each local system, except the $n^{th}$ local system, transmits an additional increment of interchange power. The $n^{th}$ local system must, therefore, receive all of these increments of interchange power. Under these conditions, Equations 21 specify that the incremental costs of interchange power received at the $n^{th}$ local system must be the same for all of the other local systems and that this common incremental cost of interchange power must be the same as the incremental cost of power received by the load center of the $n^{th}$ local system from its local generating stations.

Equations 21 may be rewritten as follows $$\lambda_a - \lambda_a \frac{\partial P_{La}}{\partial P_{Ia}} - \lambda_b \frac{\partial P_{Lb}}{\partial P_{Ia}} - \cdots - \lambda_{n-1} \frac{\partial P_{L, n-1}}{\partial P_{Ia}} = \lambda_n + \lambda_n \frac{\partial P_{Ln}}{\partial P_{Ia}}$$

$$-\lambda_a \frac{\partial P_{La}}{\partial P_{Ib}} + \lambda_b - \lambda_b \frac{\partial P_{Lb}}{\partial P_{Ib}} - \cdots - \lambda_{n-1} \frac{\partial P_{L, n-1}}{\partial P_{Ib}} = \lambda_n + \lambda_n \frac{\partial P_{Ln}}{\partial P_{Ib}}$$

$$\vdots \qquad \vdots \qquad \vdots \qquad \vdots \qquad \vdots$$

$$-\lambda_a \frac{\partial P_{La}}{\partial P_{I, n-1}} - \lambda_b \frac{\partial P_{Lb}}{\partial P_{I, n-1}} - \cdots + \lambda_{n-1} - \lambda_{n-1} \frac{\partial P_{L, n-1}}{\partial P_{I, n-1}} = \lambda_n + \lambda_n \frac{\partial P_{Ln}}{\partial P_{I, n-1}}$$

(22)

Inter-area coordination Equations 22 may be interpreted as follows. The respective incremental costs of power delivered to the boundary of the $n^{th}$ local system for an incremental transfer of interchange power to each of the other local systems must be equal to the respective required costs of power at this boundary for each of the other local systems to receive this increment of interchange power at the respective load centers thereof at the same incremental cost as power is received from the respective local generating stations. Again, a converse interpretation may be placed on Equations 22. That is, each of the local systems, other than the $n^{th}$ local system, must deliver an increment of interchange power to the boundary of the $n^{th}$ local system at an incremental cost equal to the corresponding required incremental cost of power at this boundary for the $n^{th}$ local system to receive this increment of power at its load center at the same incremental cost as power is received from its local generating stations. Both groups of Equations 21 and 22 represent the theory of operation of the integrated system computer of this invention.

For purposes of clarity in the succeeding description, the aforementioned $n^{th}$ local system is termed the "reference" system and the remaining $n-1$ local systems are termed "peripheral" systems. Equations 21 and 22 specify that in the integrated system computer a pair of incremental costs of interchange power are determined at a predetermined location in the integrated system for each of the peripheral systems for transfer of an increment of power from the corresponding peripheral system to the reference system or for transfer of an increment of power from the reference system to the corresponding peripheral system. One value of each of these pairs is based on the incremental cost of power received at its load center by the corresponding peripheral system from the generating stations thereof and the other value of each pair is based on the incremental cost of power received at its load center by the reference system from the generating stations thereof.

Figure 5:
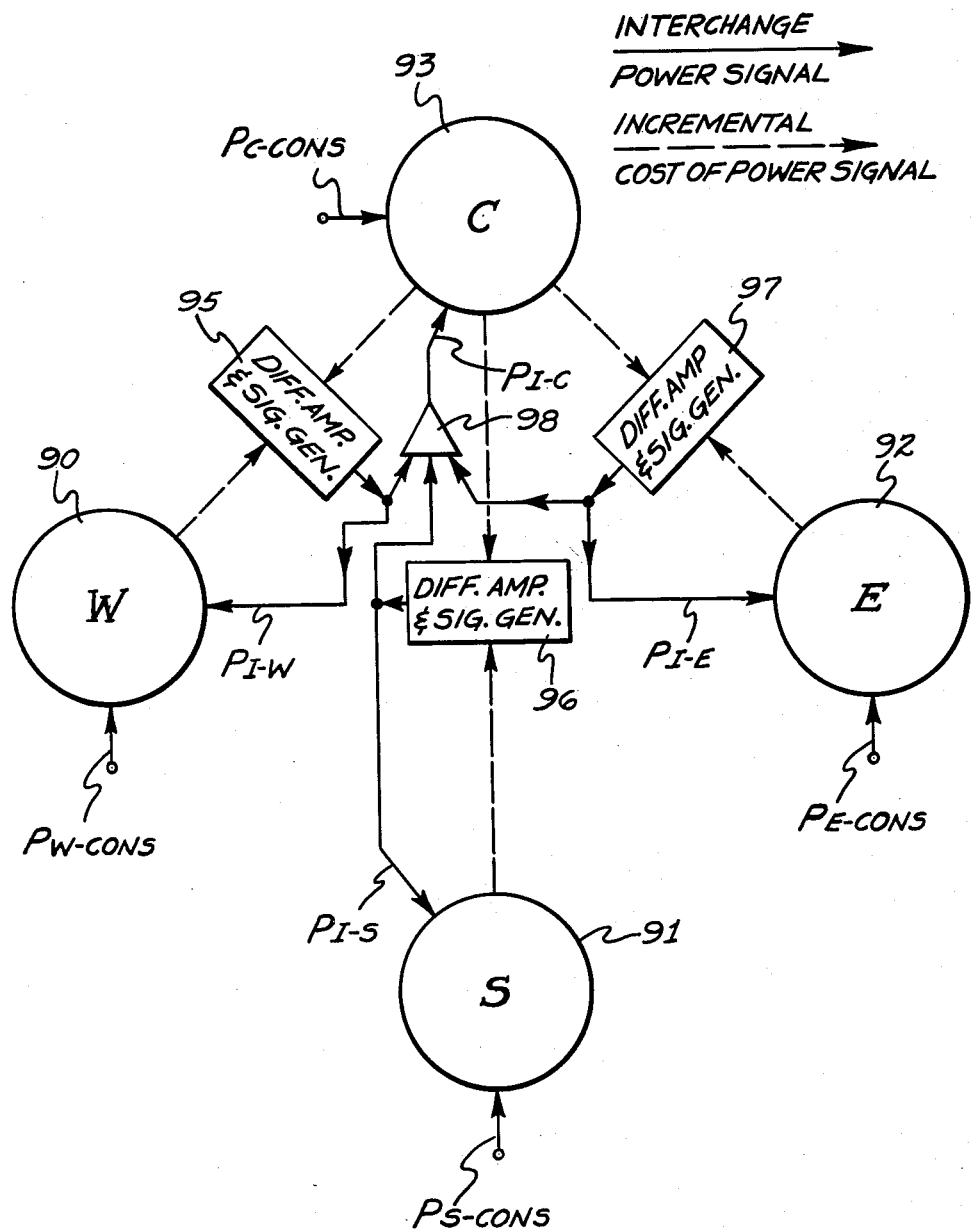
FIGURE 5 is a block diagram of the concept of operation of the embodiment of this invention.

FIGURE 5 illustrates one concept of operation of the integrated system computer of this invention. FIGURE 5 is not to be considered as a block diagram of the computer itself, but is only employed as an aid in the understanding of the operation of the embodiment to be described hereinafter. Single-area computing apparatuses 90, 91, 92 and 93, which are similar to the apparatus shown in FIG. 1, are provided for the respective Western, Southern, Eastern and Central local power transmission systems shown in FIG. 4. The Central local system is established as the reference system in the integrated system computer. Each of apparatuses 90-93 receives a pair of input signals, one of these input signals representing the desired total power to be consumed in the corresponding local system (i.e., $P_{Rk} + P_{Lk}$ of Equations 12) and the other of these input signals representing the algebraic value of power delivered to the corresponding local system by the other local systems (i.e., $P_{Ik}$ of Equations 12). In response to this pair of input signals, and to the computed common incremental cost of power, $\lambda$, of the corresponding local system, each single-area computing apparatus of a peripheral system delivers a signal representing the incremental cost of power at the boundary of the reference system for transfer of an increment of power from the corresponding peripheral system to the reference system, this incremental cost being based on said value of $\lambda$. The reference system single-area computing apparatus 93 provides a signal for each peripheral system representing the required incremental cost of power at the boundary of the reference system for transfer of an increment of power from the corresponding peripheral system to the reference system, this incremental cost being based on the value of $\lambda$ computed by apparatus 93.

The incremental cost of power signal delivered by apparatus 90 and the corresponding signal delivered by apparatus 93 are applied to a differential amplifier and signal generator 95. Differential amplifier and signal generator 95 is adapted to provide an output signal representing the value of interchange power, $P_{I-W}$, delivered to the Western local system and in response to any difference in the pair of signals received thereby to alter the value of this output signal in such a sense as to tend to reduce the magnitude of this difference. The signal delivered by apparatus 90 represents the left side of an Equation 22 and the corresponding signal delivered by apparatus 93 represents the right side of this equation. If these two signals are unequal, this equation is not satisfied. Differential amplifier and signal generator 95 thereupon readjusts the interchange power signal, $P_{I-W}$, in such a sense as to tend to satisfy this equation. In a similar manner, differential amplifier and signal generators 96 and 97 receive pairs of corresponding incremental cost of power signals and in response thereto deliver signals representing the required value of interchange power for the respective Southern and Eastern local systems. All output signals of differential amplifier and signal generators 95, 96 and 97 are applied to a summing amplifier 98, the inverted output signal of which represents the value of interchange power received by the Central local system, in accordance with Equation 13.

In the integrated system computer concept of FIG. 5, each incremental cost of power signal may, alternatively, represent the incremental cost of power at the boundary of the reference system for transfer of an increment of power from the reference system to the corresponding peripheral system. The computer of FIG. 5, in accordance with Equations 22, is also adapted to compare the incremental costs of interchange power at other desired locations in the integrated system and is not limited in its computation to the reference system boundary. In fact, the location chosen may be the reference local system load center, in accordance with Equations 21.

Thus, each peripheral system computing apparatus of this invention provides an output signal representing the incremental cost of power at a corresponding predetermined location in the integrated system for a transfer of power between the corresponding peripheral system and the reference system, this incremental cost being based on the common incremental cost of power at the peripheral system. The reference system computing apparatus provides an output signal for each peripheral system representing the incremental cost of power at the corresponding predetermined location for a transfer of power between the corresponding peripheral system and the reference system, this incremental cost being based on the common incremental cost of power at the reference system.

In its more general concept, the computing apparatus of this invention provides a pair of signals for each of $n-1$ different pairs of local systems of an integrated system comprising $n$ local systems. The two signals of each signal pair represent respectively the incremental costs of power at a corresponding predetermined location for a hypothetical transfer of an increment of power between the corresponding pair of local systems, based on the common incremental cost of power at each of the two corresponding local systems. In response to the differences between the two signals of each of the $n-1$ signal pairs, $n$ signals are derived, which represent respectively the value of interchange power received by the $n$ local systems.

Consider once again FIG. 4. Power may be transferred between any two local systems of the integrated system either over the tie-lines directly interconnecting the two systems or through other local systems. For example, power may be exchanged between the Western and Central local systems directly over tie-line 1. Power may also be transferred between the Western and Central systems through the Southern local system by routing power over tie-line 2 and then over tie-lines 3-6. Similarly, power may be exchanged between the Central and Southern local systems directly over tie lines 3-6 or through the Western local system over tie-lines 1 and 2. Power transferred from one local system to another through a third local system is termed "wheeled" power. A change in wheeled power results in a change of transmission losses in the system through which the power is wheeled. For example, when power wheeled through the Western local system is increased during an increase in power exchanged between the Central and Southern local systems there is a corresponding change of power on tie-lines 1 and 2. This change results in an increase in wheeling losses incurred in the Western local system. Such changes in losses in a system through which power is wheeled are referred to as incremental wheeling losses.

Therefore, whenever a variation in interchange power occurs, the computation of the incremental cost of power at the reference system boundary must take into consideration the incremental cost of these wheeling losses. Thus, all terms on the left-hand side of Equations 22 which involve two areas, are terms representing the incremental cost of wheeling losses. For example, the term $$\lambda_b \frac{\partial P_{Lb}}{\partial P_{Ia}}$$

represents the incremental cost of wheeling losses in the $b^{th}$ local system for a change in interchange power of the $a^{th}$ local system. The latter portion of this term represents the incremental wheeling losses in the $b^{th}$ local system. Although computation involving the incremental cost of wheeling losses is not shown in FIG. 5, for purposes of simplicity, the embodiment of this invention provides for inclusion of wheeling loss terms.

Wheeling power is not confined to the integrated system, itself, but power may be transferred between two local systems of the integrated system through at least one of the foreign systems connected to the integrated system. For example, power may be transferred between the Western and Central systems through foreign system $X_3$. In this example, since the foreign system is not a part of the integrated system, its incremental cost of wheeling losses is not considered by the integrated system computer. However, where power is transferred between the Southern and Central systems through the cascaded foreign system $X_4$, foreign system $X_1$ and the Eastern system, the incremental cost of wheeling losses through the Eastern local system is considered by the integrated system computer.

Individual Tie-Line Considerations

Inter-area coordination Equations 21 and 22 treat each value of interchange power in its entirety. Thus, the typical term $$\frac{\partial P_{La}}{\partial P_{Ia}}$$

represents the incremental losses in the $a^{th}$ local system for a variation in total interchange power received by the $a^{th}$ local system. However, the interchange power received by a local system is transmitted thereto on a plurality of tie-lines. For example, the Western system receives interchange power directly from the Central and Southern systems on respective tie-lines 1 and 2, and from foreign systems $X_3$ and $X_4$ on respective tie-lines 14 and 15.

A tie-line in an integrated system is adapted to transfer power directly between the pair of local systems connected thereto and to transfer wheeling power through either one of this pair of local systems. When an additional increment of interchange power is received by a system, this increment is distributed among the tie-lines connected thereto in accordance with the relative self and mutual impedances of the tie-lines and in accordance with the amount of power already flowing over each tie-line. The resulting incremental transmission losses associated with each tie-line contribute toward the total incremental losses in a local system for variation in interchange power. In a similar manner, the total incremental wheeling losses in a local system depend on the distribution of wheeled power over the group of tie-lines transmitting the wheeled power into the local system and over the group of tie-lines transmitting the wheeled power out of the local system. Therefore, to determine the values of the incremental loss terms of Equations 21 and 22, the individual tie-line incremental loss contributions must be determined and then properly combined.

Since the incremental power losses in a local system are a function of the individual powers transmitted on each tie-line connected thereto, and since each of these individual tie-line powers is a function of the total interchange power received by a local system, each incremental loss term of the inter-area coordination Equations 21 and 22 may be expressed as $$\frac{\partial P_{Lj}}{\partial P_{Ik}} = \sum_y \frac{\partial P_{Lj}}{\partial P_{Tjy}} \frac{\partial P_{Tjy}}{\partial P_{Ik}} \qquad (23)$$

where $\frac{\partial P_{Lj}}{\partial P_{Tjy}}$ represents the ratio of change in transmission losses in the $j^{th}$ local system to change in power transmitted over tie-line $y$ connected thereto when an additional increment of power is delivered to the load center of the $j^{th}$ local system over tie-line $y$, $\frac{\partial P_{Tjy}}{\partial P_{Ik}} \equiv \beta_{jyk}$ represents the ratio of the change in power transmitted over tie-line $y$ into system $j$ to the increment of total interchange power delivered to the $k^{th}$ local system.

Substituting Equation 23 into Equations 22, there result $$\lambda_a - \lambda_a \sum_y \frac{\partial P_{La}}{\partial P_{Tay}} \beta_{aya} - \lambda_b \sum_y \frac{\partial P_{Lb}}{\partial P_{Tby}} \beta_{bya} - \cdots - \lambda_{n-1} \sum_y \frac{\partial P_{L,n-1}}{\partial P_{T,n-1y}} \beta_{n-1,ya} = \lambda_n + \lambda_n \sum_y \frac{\partial P_{Ln}}{\partial P_{Tny}} \beta_{nya}$$

$$-\lambda_a \sum_y \frac{\partial P_{La}}{\partial P_{Tay}} \beta_{ayb} + \lambda_b - \lambda_b \sum_y \frac{\partial P_{Lb}}{\partial P_{Tby}} \beta_{byb} - \cdots - \lambda_{n-1} \sum_y \frac{\partial P_{L,n-1}}{\partial P_{T,n-1,y}} \beta_{n-1,yb} = \lambda_n + \lambda_n \sum_y \frac{\partial P_{Ln}}{\partial P_{Tny}} \beta_{nyb}$$

$$\vdots$$

$$-\lambda_a \sum_y \frac{\partial P_{La}}{\partial P_{Tay}} \beta_{ay,n-1} - \lambda_b \sum_y \frac{\partial P_{Lb}}{\partial P_{Tby}} \beta_{by,n-1} - \cdots + \lambda_{n-1} - \lambda_{n-1} \sum_y \frac{\partial P_{L,n-1}}{\partial P_{T,n-1,y}} \beta_{n-1,y,n-1} = \lambda_n + \lambda_n \sum_y \frac{\partial P_{Ln}}{\partial P_{Tny}} \beta_{ny,n-1}$$

(24)

The terms $$\frac{\partial P_{Lj}}{\partial P_{Tjy}}$$

are determined by partially differentiating Equation 7 with respect to the terms representing the particular tie-line powers, $$\frac{\partial P_{Lj}}{\partial P_{Tjy}} = \sum_m 2 B_{mTjy} P_m \quad (25)$$

where $B_{mTjy}$ represents transmission loss constants of the $j^{th}$ local system transmission network, and $P_m$ represents the powers delivered by the generating stations of the $j^{th}$ local system and the powers transmitted on the tie-lines connected to the $j^{th}$ local system.

The values of $B_{mTjy}$ are determined by the same methods by which the values of $B_{mn}$ in Equation 7 are determined.

The values of the terms $\beta_{jyk}$ may be determined by conventional circuit analysis methods, wherein the change in power of one of a plurality of transmission paths in a network may be determined from network parameters and a knowledge of the change of total power over an aggregate of these transmission paths. Specific methods of computation are indicated in "Analysis of Losses in Loop-Interconnected Systems," A. F. Glimn, L. K. Kirchmayer, G. W. Stagg, AIEE Trans., vol. 72, part III, 1953, pp. 796–807; and in "Improved Method of Interconnecting Transmission Loss Formulas," A. F. Glimn, L. K. Kirchmayer, J. J. Skiles, AIEE Trans. Paper 58–513, 1958.

*Integrated System Computer*

The integrated system computer shown in FIGS. 6a and 6b is adapted to calculate the necessary generation schedule to maintain in economic dispatch the integrated power transmission system shown in FIG. 4. Single-area computing apparatuses 101, 102, 103 and 104, each of the type shown in FIG. 1, are provided respectively for the Western, Southern, Central and Eastern local systems of the integrated system. In this computer, the Central local system has veen designated as a reference system. Although a particular local system has been selected as a reference system for purposes of computation, where it is desired to employ a reference system in the computation, any other local system could have been selected and the computer designed in accordance with such selection.

Each one of single-area computing apparatuses 101–104 comprises a local computer, which has previously been described in detail. In addition to the local computer portion thereof, each of these single-area computing apparatuses comprises additional means for providing various combinations of calculated incremental power losses in the corresponding local system for incremental changes of power on each of the tie-lines connected to the local system. Each single-area computing apparatus receives a plurality of signals representing respectively the power transmitted on each tie-line connected to the corresponding local system; a signal representing the desired total power to be consumed in the corresponding local system; and a signal representing the algebraic value of interchange power delivered to the corresponding local system. Each single-area computing apparatus delivers a plurality of signals representing respectively the total power supplied by each generating station of the corresponding local system; a plurality of signals representing the cost of transmission losses in the corresponding local system for an incremental change in total interchange power received thereby, or in interchange power transmitted from the corresponding local system to a foreign system, these signals hereinafter being termed "cost weighting" signals; and a plurality of signals representing the incremental cost of wheeling losses for transferring wheeled power through the corresponding local system, these signals hereinafter being termed "wheeling cost" signals.

Within each block that symbolically represents a single-area computing apparatus, in FIG. 6, a received signal representing a tie-line transmitted power is identified by the notation $P_y$, where $y$ identifies the tie-line number; a delivered signal representing a generating station power output is identified by the notation $P_{Gji}$, where $ji$ signifies the $i^{th}$ generating station of the $j^{th}$ local system; a delivered cost weighting signal is identified by the notation $J_1$—$J_2$ (CW), where $J_1$ and $J_2$ represent the two systems exchanging power for which the corresponding incremental cost of losses is computed; and a delivered wheeling cost signal is identified by the notation $J_1$—$J_2$ (WH), where $J_1$ and $J_2$ represent the two systems exchanging power for which the corresponding incremental cost of wheeling losses is computed.

In the preceding discussion of the concept of the integrated system computer, shown in FIG. 5, it was pointed out that the signals representing the values of interchange power required to maintain the integrated system in economic dispatch are obtained by comparing signal pairs representing the incremental cost of power at predetermined locations in the integrated system for transfer of power between the peripheral systems and the reference system. These incremental cost of power signals, described by each side of Equations 22, are computed from three types of signals, a first type of signal, $\lambda$, representing the common incremental cost of received power in a local power transmission system; a second type of signal, $$\frac{\partial P_{Lj}}{\partial P_{Ij}}$$

representing the incremental transmission losses in a local system for a change in interchange power received thereby; and a third type of signal, $$\frac{\partial P_{Lj}}{\partial P_{Ik}}$$

representing the incremental transmission losses in a local system for a change in power wheeled therethrough. Details of the theory and procedures by which the second and third signal types may be obtained are shown in Equations 23 and 24. That portion of the single-area computing apparatus of FIG. 1 comprising the portion of matrix 40 to the right of the vertical dotted line; potentiometers 106, 107, 108, 109, 110 and 111; and incremental cost of loss matrix 114 is adapted to provide these second and third signal types.

In the incremental transmission loss matrix 40 of FIG. 1, shown in detail in FIG. 2, a combining lead 50 is provided for each tie-line connected to the corresponding local system, in addition to the combining leads 50 provided for the local generating stations. Six tie-lines are connected to the Southern system so that six corresponding combining leads 50 must be provided. Each input signal to the matrix is multiplied by a corresponding one of potentiometers 47 for each tie-line combining lead 50. Since eleven input signals are supplied to the Southern system matrix 40, eleven potentiometers 47 are coupled to each tie-line combining lead 50. Each potentiometer 47 so coupled to a tie-line combining lead 50 is adjusted to represent the corresponding magnitude of $B_{mTjy}$ of Equation 25. The corresponding switch 48 is set in accordance with the polarity designation of $B_{mTjy}$. For matrix 40, the values of the subscript $m$ of $B_{mTjy}$ range from 1 to 11, depending on the one of the eleven input signals to be multiplied by the corresponding potentiometer 47; S is substituted for the subscript $j$ to represent the Southern local system; and the subscript $y$ bears the values 2, 3, 4, 5, 6, and 16, depending on the particular tie-line corresponding to the combining lead 50 to which the potentiometer 47 is coupled.

The eleven signal applied to each combining lead 50 are algebraically added by the corresponding one of summing amplifiers 54, and a signal representing the summation is delivered at a corresponding output terminal 56. Each signal delivered at a terminal 56, therefore, represents the incremental transmission losses in the Southern system for the corresponding tie-line, $$\frac{\partial P_{LS}}{\partial P_{TSy}}$$

in accordance with Equation 25.

The signals delivered at terminals 56 are applied to respective potentiometers 106, 107, 108, 109, 110, and 111, shown in FIG. 1. The movable arm of each of potentiometers 106–111 is mechanically ganged to the movable arm of potentiometer 74, so that the position thereof represents the value of $\lambda$ for the Southern system. Each of potentiometers 106–111 multiplies the incremental transmission loss signal received thereby by the value of $\lambda_S$ and delivers an output signal representing the incremental cost of transmission losses, based on the common local incremental cost of power; i.e., $$\lambda_S \frac{\partial P_{LS}}{\partial P_{TSy}}$$

Therefore, these output signals of potentiometers 107–111 represent respectively the costs of transmission losses in the Southern local system for an incremental change in power delivered to the Southern local system on each of tie-lines 2, 3, 4, 5, 6 and 16.

The output signals of potentiometers 106–111 are applied to the input terminals of incremental cost of loss matrix 114. Matrix 114 is similar in construction to the matrix of FIG. 2. Matrix 114, therefore, is adapted to multiply each incoming signal by a plurality of discrete values, and to provide various combinations of the resulting products as the aforementioned cost weighting and wheeling cost signals.

An example of one of the output signals delivered by matrix 114 is the cost weighting signal representing the cost of transmission losses in the Southern system for an incremental change of total interchange power received by the Southern system. The value of this incremental cost of losses is given by $$\$_{SS} = \lambda_S \sum_y \frac{\partial P_{LS}}{\partial P_{TSy}} \beta_{SyS} \quad (26)$$

where $\$_{SS}$ represents the cost of losses in the Southern system for an incremental change in total interpower delivered to the Southern system.

Equation 26 is seen to be a particular term of the inter-area coordination Equations 24.

Equation 26 may be expanded to illustrate how matrix 114 operates on the signals received thereby to generate the incremental cost of loss signal represented by Equation 26, as follows $$\$_{SS} = \lambda_S \left[ \frac{\partial P_{LS}}{\partial P_{TS2}} \beta_{S2S} + \frac{\partial P_{LS}}{\partial P_{TS3}} \beta_{S3S} + \frac{\partial P_{LS}}{\partial P_{TS4}} \beta_{S4S} \right.$$
$$\left. + \frac{\partial P_{LS}}{\partial P_{TS5}} \beta_{S5S} + \frac{\partial P_{LS}}{\partial P_{TS6}} \beta_{S6S} + \frac{\partial P_{LS}}{\partial P_{TS16}} \beta_{S16S} \right] \quad (27)$$

The signal represented by Equation 27 is provided by a summing amplifier 54 terminating one of the combining leads 50 of matrix 114, this combining lead 50 receiving the six signals represented by the right-hand portion of Equation 27. From Equation 27 it is seen that each signal received by matrix 114 is multiplied by $\beta_{SyS}$. These values of $\beta_{SyS}$ are provided by adjusting the corresponding potentiometers 47 and switches 48 of the matrix.

An example of a wheeling cost signal delivered by matrix 114 is that which represents the cost of transmission losses in the Southern local system for an incremental change of total interchange power received by the Western system, and is given by $$\$_{SW} = \lambda_S \left[ \frac{\partial P_{LS}}{\partial P_{TS2}} \beta_{S2W} + \frac{\partial P_{LS}}{\partial P_{TS3}} \beta_{S3W} + \frac{\partial P_{LS}}{\partial P_{TS4}} \beta_{S4W} \right.$$
$$\left. + \frac{\partial P_{LS}}{\partial P_{TS5}} \beta_{S5W} + \frac{\partial P_{LS}}{\partial P_{TS6}} \beta_{S6W} + \frac{\partial P_{LS}}{\partial P_{TS16}} \beta_{S16W} \right] \quad (28)$$

The six potentiometers 47 coupled to the combining lead 50 which delivers the six signals represented by the right-hand portion of Equation 28 are adjusted to represent respectively the values of $\beta_{SyW}$ shown therein.

Another example of a wheeling cost signal delivered by matrix 114 is that which represents the cost of transmission losses in the Southern system for an incremental change in power delivered by the Central system to a predetermined location in foreign system $X_3$, and is given by $$\$_{SX3a} = \lambda_S \left[ \frac{\partial P_{LS}}{\partial P_{TS2}} \beta_{S2X3a} + \frac{\partial P_{LS}}{\partial P_{TS3}} \beta_{S3X3a} + \frac{\partial P_{LS}}{\partial P_{ST4}} \beta_{S4X3a} \right.$$
$$\left. + \frac{\partial P_{LS}}{\partial P_{ST5}} \beta_{S5X3a} + \frac{\partial P_{LS}}{\partial P_{TS6}} \beta_{S6X3a} + \frac{\partial P_{LS}}{\partial P_{ST16}} \beta_{S16X3a} \right] \quad (29)$$

In all, seven signals representing the incremental cost of losses in the Southern system for respective changes of power exchanged between local systems or between a foreign system and a local system are delivered by matrix 114. The settings of all potentiometers in matrix 114 to deliver these seven output signals in response to the six received signals is given in the table below.

| Inputs | | | | | | | |
|---|---|---|---|---|---|---|---|
| $\dfrac{\partial P_{LS}}{\partial P_{TS2}}$ | $\beta_{S2W}$ | $\beta_{S2X3a}$ | $\beta_{S2X3b}$ | $\beta_{S2X1}$ | $\beta_{S2S}$ | $\beta_{S2X4a}$ | $\beta_{S2X4b}$ |
| $\dfrac{\partial P_{LS}}{\partial P_{TS3}}$ | $\beta_{S3W}$ | $\beta_{S3X3a}$ | $\beta_{S3X3b}$ | $\beta_{S3X1}$ | $\beta_{S3S}$ | $\beta_{S3X4a}$ | $\beta_{S3X4b}$ |
| $\dfrac{\partial P_{LS}}{\partial P_{TS4}}$ | $\beta_{S4W}$ | $\beta_{S4X3a}$ | $\beta_{S4X3b}$ | $\beta_{S4X1}$ | $\beta_{S4S}$ | $\beta_{S4X4a}$ | $\beta_{S4X4b}$ |
| $\dfrac{\partial P_{LS}}{\partial P_{TS5}}$ | $\beta_{S5W}$ | $\beta_{S5X3a}$ | $\beta_{S5X3b}$ | $\beta_{S5X1}$ | $\beta_{S5S}$ | $\beta_{S5X4a}$ | $\beta_{S5X4b}$ |
| $\dfrac{\partial P_{LS}}{\partial P_{TS6}}$ | $\beta_{S6W}$ | $\beta_{S6X3a}$ | $\beta_{S6X3b}$ | $\beta_{S6X1}$ | $\beta_{S6S}$ | $\beta_{S6X4a}$ | $\beta_{S6X4b}$ |
| $\dfrac{\partial P_{LS}}{\partial P_{TS16}}$ | $\beta_{S16W}$ | $\beta_{S16X3a}$ | $\beta_{S16X3b}$ | $\beta_{S16X1}$ | $\beta_{S16S}$ | $\beta_{S16X4a}$ | $\beta_{S16X4b}$ |

Outputs:

$\$_{SW}$  $\$_{SX3a}$  $\$_{SX3b}$  $\$_{SX1}$  $\$_{SS}$  $\$_{SX4a}$  $\$_{SX4b}$

In the above table a typical output signal notation $\$_{Sk}$ represents the cost of losses in the Southern system for an incremental change in total interchange power received by the $k^{th}$ local system. A notation $\$_{SXi}$ represents the cost of losses in the Southern system for an incremental change in total power received by the integrated system from the $X_i^{th}$ foreign system at the designated locations in the $X_i^{th}$ foreign systems. The sum of the values of $\beta$ in each of columns $\$_{SS}$, $\$_{SX4a}$, and $\$_{SX4b}$ is equal to unity, since this sum represents the totality of all fractional portions of Southern system interchange power. The sum of the values of $\beta$ in the remaining columns is zero since this sum represents the totality of all the fractional portions of power wheeled through the Southern system.

Referring once again to FIG. 6, the seven incremental cost of loss signals indicated in the above table are shown delivered on respective ones of leads 116–122 of computing apparatus 102. Leads 116–122 form part of a cable 124 and are connected to apparatus to be described hereinafter.

Computing apparatus 102 delivers the plurality of signals representing the total power supplied by each generating station of the Southern system on respective ones of leads 126–130. Leads 126–130 form a cable 132 for connection to a tie-line power matrix 134, to be described hereinafter.

In a similar manner, computing apparatus 101 delivers a plurality of cost weighting and wheeling cost signals on respective ones of leads 136–141. The value of the signal delivered on each of leads 136–141 is indicated opposite the corresponding leads. Leads 136–141 also form part of cable 124. Computing apparatus 101 delivers the plurality of signals representing the total power supplied by each generating station of the Western system on respective ones of leads 144–148. Leads 144–148 form a cable 149 for connection to matrix 134.

Computing apparatus 103 delivers a plurality of cost weighting and wheeling cost signals on respective ones of leads 150–159. Leads 150–159 also form part of cable 124. Computing apparatus 103 delivers the plurality of signals representing the total power supplied by each generating station of the Central system on respective ones of leads 161 and 162. Leads 161 and 162 form a cable 163 for connection to matrix 134.

Computing apparatus 104 delivers a plurality of cost weighting and wheeling cost signals on respective ones of leads 164–170. Leads 164–170 also form a part of cable 124. Computing apparatus 104 delivers the plurality of signals representing the total power supplied by each generating station of the Eastern system on respective ones of leads 172 and 173. Leads 172 and 173 form a cable 174 for connection to matrix 134.

In addition to the above described signals delivered by computing apparatuses 101–104, each single-area computing apparatus delivers a signal representing the common incremental cost of power, $\lambda_k$, received by the corresponding local system on respective ones of leads 176, 177, 178 and 179. Leads 176–179 also form part of cable 124.

Cable 124 is split into two cables 181 and 182. Cable 181 has the leads thereof connected to a cost comparison network 185. Cable 182 has the leads thereof connected to a foreign power cost weighting network 186.

The description and method of operation of cost comparison network 185 will now be described. In network 185 a signal is produced for each peripheral system to represent the incremental cost of power at a respective predetermined location in the integrated system, based on the increment of power having been transmitted from the peripheral system to the reference system at the common incremental cost of power in the peripheral system, and this signal is compared with a corresponding signal representing the incremental cost of power at this respective predetermined location, based on this increment of power having been received by the reference system from the peripheral system at the common incremental cost of power in the reference system. A summing amplifier 190 combines the signals delivered on leads 166 and 179. The signal of lead 179 is attenuated by resistor 192. This attenuation is necessary because of the two signals delivered on leads 166 and 179 are generated at different points in the computer and pass through different amplifiers and, therefore, bear different scale factors; that is, a different number of dollars per megawatt-hour per volt of signal. Therefore, resistor 192 serves to alter the scale factor of the signal delivered on lead 179, so that the two signals applied to summing amplifier 190 have the same scale factors. The output signal delivered by summing amplifier 190 represents the incremental cost of power at the boundary of the Central system for transfer of an increment of power from the Eastern system to the Central system, based on the incremental cost of power at the Eastern system, and is represented symbolically by $\lambda_E + \$_{EE}$. The signals delivered on leads 157 and 178 are combined by a summing amplifier 193. The output signal of summing amplifier 193 represents the incremental cost of power at the boundary of the Central system for a transfer of an increment of power from the Eastern system to the Central system, based on the incremental cost of power at the Central system, and is represented by $\lambda_C - \$_{CE}$.

The signals delivered by summing amplifiers 190 and 193 are applied to a differential amplifier 194, wherein the output signal of summing amplifier 193 is subtracted from that of summing amplifier 190. The output signal of differential amplifier 194 represents any difference between the two signals received thereby, and is designated as $\Delta_{E-C}$. Therefore, the output signal of differential amplifier 194 is given by $$\Delta_{E-C} = \lambda_E + \$_{EE} - (\lambda_C - \$_{CE}) \tag{30}$$

Equation 30 may be expanded as follows $$\Delta_{E-C} = \lambda_E + \lambda_E \sum_y \frac{\partial P_{LE}}{\partial P_{ETy}} \beta_{EyE} - \left( \lambda_C - \lambda_C \sum_y \frac{\partial P_{LC}}{\partial P_{TCy}} \beta_{CyE} \right) \tag{31}$$

When $\Delta_{E-C}$ is zero, Equation 31 corresponds to one of Equations 24. No wheeling cost terms are included in Equations 30 and 31, since the inclusion of a wheeling cost term is a matter of choice in the computer design and depends on the relative magnitudes of the incremental cost of wheeling loss term and the other incremental cost of loss terms. In the specific instance, the quantity of power wheeled through the foreign systems when power is exchanged between the Eastern and Central local systems is negligible compared to the quantity of power directly transferred.

The signals delivered on leads 156 and 178 are combined by a summing amplifier 195. The output signal of summing amplifier 195 represents the incremental cost of power at the boundary of the Central system for transfer of an increment of power from the Western system to the Central system, based on the incremental cost of power at the Central system, and is given by $\lambda_C - \$_{CW}$. The signals delivered on leads 116, 140 and 176 are combined by a summing amplifier 196. The output signal of summing amplifier 196 represents the incremental cost of power at the boundary of the Central system for transfer of an increment of power from the Western system to the Central system, based on the incremental cost of power at the Western system, and is given by $\lambda_W + \$_{WW} + \$_{SW}$. The signals delivered by summing amplifiers 195 and 196 are applied to a differential amplifier 197, wherein the output signal of summing amplifier 195 is subtracted from that of summing amplifier 196. The output signal of differential amplifier 197 is given by $$\Delta_{W-C} = \lambda_W + \$_{WW} + \$_{SW} - (\lambda_C - \$_{CW}) \qquad (32)$$

Equation 32 represents this comparison of the incremental costs of power at the boundary of the Central system for transfer of an increment of power from the Western system to the Central system. The term $\$_{SW}$ in Equation 32 represents the incremental cost of wheeling losses in the Southern local system for a transfer of power between the Western and Central systems, and is included because a substantial contribution to the incremental cost of power at the boundary of the Central system is provided by power wheeled from the Western system through the Southern system to the Central system.

The signals delivered on leads 136, 155, 164, and 178 are combined by a summing amplifier 198. The output signal of summing amplifier 198 represents the incremental cost of power at the boundary of the Southern system for transfer of an increment of power from the Southern system to the Central system, based on the incremental post of power at the Central system, and is given by $\lambda_C - \$_{CS} - \$_{ES} - \$_{WS}$. The signals delivered on leads 120 and 177 are combined by a summing amplifier 199. The output signal of summing amplifier 199 represents the incremental cost of power at the boundary of the Southern system for transfer of an increment of power from the Southern system to the Central system, based on the incremental cost of power at the Southern system, and is given by $\lambda_S + \$_{SS}$. The signals delivered by summing amplifiers 198 and 199 are applied to a differential amplifier 200, wherein the output signal of summing amplifier 198 is subtracted from that of summing amplifier 199. The output signal of differential amplifier 200 is given by $$\Delta_{S-C} = \lambda_S + \$_{SS} - (\lambda_C - \$_{CS} - \$_{ES} - \$_{WS}) \qquad (33)$$

Equation 33 includes two wheeling cost terms; that is, the incremental cost of wheeling losses in both of the Eastern and Western systems for transfer of power between the Southern and Central systems. The wheeling costs incurred in the Eastern system are due to power being wheeled through the cascaded foreign system $X_4$, foreign system $X_1$ and the Eastern system. The incremental costs of power for an exchange between the Southern and Central systems are compared at the boundary of the Southern system, in contrast to the comparisons previously described, which are made at the boundary of the Central system. Such a comparison is taught by Equations 24, wherein the wheeling cost terms may be transferred from the right-hand side of any one of Equations 24 to the left-hand side. The effect of such a transfer of terms is to change the boundary for comparison from that of the reference system to that of the peripheral system. In the particular instance, a comparison is made at the boundary of the Southern system, since the Southern system is a separate power company, and it is desirable that its power consumption and incremental costs be computed separately. However, in accordance with the principles of this invention, the incremental costs of power for an exchange between the Southern and Central systems could have been compared at the boundary of the Central system. Such an embodiment would then be more closely represented by the apparatus of FIG. 5.

The output signals of differential amplifiers 194, 197 and 200 are applied to respective servo amplifiers 202, 203 and 204. Servo amplifiers 202–204 respond to the respective signals received thereby to supply appropriate power to rotate a respective one of servomotors 205, 206 and 207. Servomotors 205–207 are mechanically coupled to and serve to rotate the movable arms of respective potentiometers 208, 209 and 210. The output signal delivered by the movable arm of potentiometer 208 represents the total interchange power received by the Eastern system, the output signal delivered by the movable arm of potentiometer 209 represents the total interchange power received by the Western system, and the output signal delivered by the movable arm of potentiometer 210 represents the total interchange power received by the Southern system. Each of potentiometers 208–210 is adapted to deliver a signal of variable amplitude, the polarity being positive if the corresponding peripheral system receives interchange power and negative if the corresponding peripheral system transmits interchange power. Means is provided for applying the output signals delivered by potentiometers 208–210 to the respective single-area computing apparatuses 104, 101, and 102. Thus, whenever one pair of incremental cost of power signals received by each of differential amplifiers 194, 197, and 200 are not alike, the integrated system is not in economic dispatch, whereupon the resulting difference signal provided by the corresponding one of these differential amplifiers serves to adjust the movable arm of the respective one of potentiometers 208–210 in a direction which tends to reduce the magnitude of the difference between the unequal signal pair. When all three pairs of incremental cost of power signals provide no corresponding difference signal the system is in economic dispatch.

The output signals of potentiometers 208–210 are transmitted through the movable arms of respective switches 212, 213 and 214 to the tie-line power matrix 134, to a summing amplifier 216, and to the respective single-area computing apparatuses 104, 101, and 102. The movable arm of switch 212 is adapted to be connected to the movable arm of potentiometer 208 or to the movable arm of a potentiometer 218. If the movable arm of switch 212 is coupled to potentiometer 208 the corresponding single-area computing apparatus 104 is included as part of the automatic portion of the integrated system computer and the interchange power signal delivered by potentiometer 208 is automatically computed for the Eastern system to be maintained in economic dispatch with the remainder of the integrated system. However, if the movable arm of switch 212 is coupled to potentiometer 218 the interchange power signal is no longer automatically adjusted, but instead the interchange power of the Eastern system is determined according to a previously prepared schedule and the value thereof is inserted into the integrated system computer by manual adjustment of the movable arm of potentiometer 218. In a similar manner, potentiometers 219 and 220 are employed to provide prescheduled interchange power signals for the corresponding Western and Southern systems.

Signals representing the pre-scheduled powers delivered by associated foreign systems are supplied by foreign power interchange controls 225. Foreign power interchange controls 225 provides a first plurality of signals representing the power delivered to the integrated system from designated locations in each of the foreign systems. This first plurality of signals is applied to tieline power matrix 134. Foreign power interchange controls 225 also provides a second plurality of signals representing the negative values of total net power delivered by the corresponding foreign systems to the integrated system. This second plurality of signals is applied to summing amplifier 216.

Summing amplifier 216, in response to the input signals applied thereto, provides an output signal representing the total interchange power received by the Central system. This is shown by the following development. The total interchange power received by each of the Eastern, Southern, Western and Central systems is given by $$P_{I-E} = P_{C-E} + P_{S-E} + P_{W-E} + \sum_i P_{Xi-E} \quad (34)$$

$$P_{I-W} = P_{C-W} + P_{S-W} + P_{E-W} + \sum_i P_{Xi-W} \quad (35)$$

$$P_{I-S} = P_{C-S} + P_{W-S} + P_{E-S} + \sum_i P_{Xi-S} \quad (36)$$

$$P_{I-C} = P_{E-C} + P_{W-C} + P_{S-C} + \sum_i P_{Xi-C} \quad (37)$$

where $P_{C-E}$, for example, represents the power transferred from the Central system to the Eastern system, and $\sum_i P_{Xi-E}$, for example, represents the total power delivered by all foreign systems to the Eastern system.

The output signal delivered by summing amplifier 216, which inverts the polarity of the signals applied thereto, is expressed in terms of the signals applied thereto, as $$\sum\nolimits_{216} = -\left( P_{I-E} + P_{I-W} + P_{I-S} - \sum_{i,k} P_{Xi-k} \right) \quad (38)$$

where $P_{Xi-k}$ represents the power transmitted from the $i^{th}$ foreign system to the $k^{th}$ local system.

Equation 38 may be partially expanded as $$\sum\nolimits_{216} = -\left( P_{I-E} + P_{I-W} + P_{I-S} - \sum_i P_{Xi-W} - \sum_i P_{Xi-S} - \sum_i P_{Xi-E} - \sum_i P_{Xi-C} \right) \quad (39)$$

Substituting Equations 34, 35, and 36 in Equation 39, there results $$\sum\nolimits_{216} = -\left( P_{C-E} + P_{C-W} + P_{C-S} - \sum_i P_{Xi-C} \right) \quad (40)$$

since certain terms are cancelled, such as $P_{S-E} = -P_{E-S}$.

Equation 40 is identical to Equation 37, and, therefore, the output signal delivered by summing amplifier 216 represents the total interchange power received by the Central system. The output signal of summing amplifier 216 is applied to single-area computing apparatus 103.

Voltmeters 227, 228, 229 and 230 are provided for measuring the interchange power signals of the respective Eastern, Western, Southern and Central systems. These voltmeters are appropriately calibrated and indicate the interchange power received by each of the corresponding local systems. Other voltmeters, not shown, are appropriately calibrated and connected to various leads of the integrated system computer for measuring powers and costs of powers at various points in the integrated system for billing purposes.

Tie-line power matrix 134 receives signals representing the power supplied by each generating station of the integrated system; signals representing the interchange power received by the Southern, Western and Eastern systems; and signals representing the power delivered to the integrated system from designated locations in each of the foreign systems. In response to the signals received thereby, matrix 134 is adapted to provide output signals representing the value of power transmitted on each tie-line of the integrated system and on the tie-lines interconnecting the integrated system and the foreign systems. Tie-line power matrix 134, a computing matrix of the type shown in FIG. 2, receives each input signal applied thereto on a positive and negative lead pair and delivers output signals for summing on appropriate combining leads, which are connected to corresponding summing amplifiers. The output signal of each summing amplifier represents the power transmitted on the corresponding tie-line and is applied, as shown, to those of single-area computing apparatuses 101–104 which are adapted to respond to this signal. For example, the summing amplifier output signal that corresponds to the power transmitted on tie-line 7 is applied to single-area computing apparatuses 103 and 104, since tie-line 7 directly interconnects the corresponding Central and Eastern systems. Each potentiometer of matrix 134 is adapted to multiply one of the received signals, representing generating station power, interchange power, or foreign power, by a corresponding factor $\alpha$, which specifies the portion of the power represented that contributes to the corresponding tie-line power. The equation for determining the value of power transferred on a particular tie-line $y$ is given by $$P_{Ty} = \sum_{k,i} \alpha_{y,ki} P_{Gki} + \sum_k \alpha_{yk} P_{I-k} + \sum_m \alpha_{ym} P_{Xm} \quad (41)$$

where $P_{Gki}$ represents the power supplied by the $i^{th}$ generating station of the $k^{th}$ local system, $P_{I-k}$ represents the total interchange power received by the $k^{th}$ local system, and $P_{Xm}$ represents the power transmitted to the integrated system from a designated location of a particular foreign system The values of the $\alpha$ terms may be determined by conventional circuit analysis methods, wherein the power delivered on a particular transmission path of a given network is expressable in terms of the sources of power within the network, the total power interchanged between various portions of the network, and the total power transferred into the network from external sources. Specific methods of computation are indicated in the aforementioned "Analysis of Losses in Loop-Interconnected Systems," by Glimn, Kirchmayer and Stagg; the aforementioned "Improved Method of Interconnecting Transmission Loss Formulas," by Glimn, Kirchmayer and Skiles; and "Analysis of Losses in Interconnected Systems," A. F. Glimn, L. K. Kirchmayer, G. W. Stagg, AIEE Trans. Paper 52–193, 1952.

The signals representing the desired total power to be consumed in the corresponding local systems are received by each of single-area computing apparatuses 101–104 at respective input terminals 232, 38, 233 and 234. These signals are entered into the computer according to a predetermined schedule by the power consumption determination network of FIG. 7. In FIG. 7, the position of the movable arm of a potentiometer 236 determines the total power consumption of the integrated system. A steady negative voltage, for example −50 v., is applied to a terminal 237 of potentiometer 236. The signal delivered by the movable arm of potentiometer 236 is a voltage which represents directly the total power, for example in megawatts, to be consumed both in load and losses by the integrated system. The output signal of potentiometer 236 is amplified and inverted by an amplifier 238. The output signal of amplifier 238 is coupled to potentiometer 240, 241, and 242. The proportion of the total integrated system load which is to be borne by the Western, Southern, and Eastern systems is determined by the settings of the movable arms of respective potentiometers 240, 241, and 242. The output signal, in volts, of each of potentiometers 240–242 represents directly the total power consumption of the corresponding local system.

The output signals of potentiometers 240–242 are applied to respective amplifiers 244, 245 and 246, where the signals are amplified and inverted. The output signals delivered by amplifiers 244–246 are applied to respective input terminals of 232, 38 and 234 of the corresponding single-area computing apparatuses of FIG. 6. The output signals of amplifiers 238, 244, 245 and 246 are also applied to a summing amplifier 248. Inasmuch as the signal delivered by amplifier 238 is of opposite polarity to the signals delivered by amplifiers 244–246, the signal delivered by summing amplifier 248 represents the difference between the total power consumed by the integrated system and the sum of the powers consumed by the Western, Southern, and Eastern systems. Therefore, the output signal of summing amplifier 248, which is delivered to input terminal 233, of single-area computing apparatus 103, represents the power consumed by the Central system. This output signal of summing amplifier 248 is adapted to have the same polarity as the output signals delivered by amplifiers 244–246.

A voltmeter 250 monitors the output signal of amplifier 238, and is calibrated to represent the total power consumption of the integrated system. Similarly voltmeters 251, 252, 253, and 254 monitor the respective output signals delivered by amplifiers 244, 245, 246 and 248, and are calibrated to represent the power consumption of the corresponding local systems.

Foreign power interchange controls 225, which are shown in detail in FIG. 8, will now be described. The value of power to be exchanged by a designated location in a foreign system with the integrated system is adjusted according to a predetermined scheduled. Foreign power interchange controls 225 produce signals representing these exchange powers scheduled for each designated location in a foreign system and the total net power to be delivered to the integrated system by each foreign system. Foreign system $X_1$ is directly connected to the integrated system by the single tie-line 8 and indirectly connected to the integrated system by tie-line 17 through foreign system $X_4$. The movable arm of a potentiometer 269 is adjusted in accordance with the predetermined schedule of power to be delivered by foreign system $X_1$ to the integrated system. A positive steady voltage is connected to one terminal and a negative steady voltage is connected to the other terminal of potentiometer 260. The signal delivered by the movable arm of potentiometer 260 is a voltage whose magnitude represents the quantity of power transmitted between foreign system $X_1$ and integrated system, and whose polarity represents the direction of this power transmission. For example, a positive voltage indicates that foreign system $X_1$ delivers power to the integrated system and a negative voltage indicates that foreign system $X_1$ receives power from the integrated system. The output signal of potentiometer 260 is delivered to a terminal 261, which is coupled to tie-line power matrix 134 of FIG. 6. The voltage delivered by potentiometer 260 is also delivered to an inverted amplifier 262. The output of amplifier 262 is delivered to a terminal 263, which is connected to summing amplifier 216 of FIG. 6. The inverted polarity of the signal of terminal 263 is provided in order that the power represented thereby be subtractive, in accordance with Equation 38.

Foreign system $X_2$ is directly connected to the integrated system by tie-lines 9–12. The power exchanged between a first location in foreign system $X_2$ and the integrated system is designated as $P_{x2a}$. The power exchanged between a second location in foreign system $X_2$ and the integrated system is designated as $P_{x2b}$. The movable arm of a potentiometer 265 is adjusted in accordance with the predetermined schedule to deliver a signal representing the desired magnitude and direction of exchange power to be scheduled for the first location in foreign system $X_2$. The output signal of potentiometer 265 is delivered to a terminal 266, which is coupled to tie-line power matrix 134. The movable arm of a potentiometer 267 is adjusted to deliver a signal representing the value of exchange power schedule for the second location in foreign system $X_2$. The output signal of potentiometer 267 is delivered to a terminal 268, which is coupled to tie-line power matrix 134. The output signals of potentiometers 265 and 267 are also coupled through resistances to a summing amplifier 270. The output signal of summing amplifier 270 has a polarity opposite the polarity of the sum of the input signals applied thereto and a magnitude which represents the total net power delivered to the integrated system by foreign system $X_2$. The output signal of summing amplifier 270 is delivered to a terminal 271, which is connected to summing amplifier 216.

In a similar manner signals representing the values of powers exchanged between foreign systems $X_3$ and $X_4$ and the integrated system are supplied by the remaining portion of the circuit of FIG. 8. The individual exchange power signals for each location in the foreign systems are delivered to tie-line power matrix 134 and the total net power signals are applied to summing amplifier 216.

*Foreign Power Cost Weighting Network*

Circuits for determining the total cost of incremental power delivered to or received from each of the foreign systems exchanging power with the integrated system are shown in the foreign power cost weighting network of FIG. 9. Cable 182 provides on the respective leads thereof cost weighting and incremental cost signals provided by computing apparatuses 101–104. The signals delivered on leads 119, 150, 167 and 179 are combined by a summing amplifier 310. The output signal delivered by summing amplifier 310 represents the cost of the next increment of power delivered from the Eastern system to foreign system $X_1$. This incremental cost is determined at the boundary of the integrated system, and is given by $$\text{Cost}_{E-X1} = \lambda_E + \$_{EX1} + \$_{CX1} + \$_{SX1} \quad (42)$$

Equation 42 may be developed by techniques similar to those employed in deriving Equations 24. Equation 42 includes the terms $\$_{CX1}$ and $\$_{SX1}$, which represent respectively the incremental cost of wheeling losses incurred in the Central and Southern systems in transferring the increment of power from the Eastern system to Foreign system $X_1$. The signal delivered by summing amplifier 310 is applied to an output terminal 311, where it is available for monitoring and billing purposes.

Power may be transferred from the Central system to two locations in foreign system $X_3$. The portion of the next increment of power to be transmitted to each of these two locations is optional in the operation of the integrated system. Therefore the incremental cost of power at the boundary of the integrated system, for a transfer of power from the Central system to Foreign system $X_3$, must be separately determined for each location of system $X_3$. The signals delivered on leads on 117, 137, 158 and 178 are combined by a summing amplifier 314. The output signal delivered by summing amplifier 314 is given by $$\text{Cost}_{C-X3a} = \lambda_C + \$_{CX3a} + \$_{WX3a} + \$_{SX3a} \quad (43)$$

Equation 43 represents the incremental cost of power at the boundary of the integrated system for transfer of power from the Central system to a first location in foreign system $X_3$. The signals delivered on leads 118, 138, 159 and 178 are combined by a summing amplifier 315. The output signal delivered by summing amplifier 315 is given by $$\text{Cost}_{C-X3b} = \lambda_C + \$_{CX3b} + \$_{WX3b} + \$_{SX3b} \quad (44)$$

Equation 44 represents the incremental cost of power at the boundary of the integrated system for a transfer of power from the Central system to a second location in foreign system $X_3$. The total cost for this next increment of power delivered by the Central system to foreign system $X_3$ depends on the respective portions of this next increment of power which are sent to the respective first and second locations of foreign system $X_3$. Potentiometers 316 and 317 are each adjusted to correspond to the respective predetermined portions of this next increment of power which are to be transmitted to these first and second locations. The movable arms of potentiometers 316 and 317 are ganged together so that the sum of the two fractions represented thereby is always equal to unity. For example, if one-quarter of this next increment of power is to be transmitted to the first location, the movable arm of potentiometer 316 is adjusted to multiply the signal applied to potentiometer 316 by the factor 0.25. Correspondingly, the movable arm of potentiometer 317 must be adjusted to multiply the signal applied to potentiometer 317 by the factor 0.75. The output signals of summing amplifiers 314 and 315 are applied respectively to potentiometers 316 and 317. The output signals of potentiometers 316 and 317 are combined by a summing amplifier 320. The output signal of summing amplifier 320 represents the incremental cost of power at the boundary of the integrated system for a transfer of power from the Central system to foreign system $X_3$, and is given by $$\text{Cost}_{C-X3} = K_{3a} \text{Cost}_{C-X3a} + K_{3b} \text{Cost}_{C-X3b} \quad (45)$$

where $K_{3a}$ represents the setting of potentiometer 316, and $K_{3b}$ represents the setting of potentiometer 317.

In a similar manner, the output signal of summing amplifier 322 is given by $$\text{Cost}_{S-X4a} = \lambda_S + \$_{SX4a} + \$_{CX4a} + \$_{WX4a} + \$_{EX4a} \quad (46)$$

and the output signal of summing amplifier 323 represents $$\text{Cost}_{S-X4b} = \lambda_S + \$_{SX4b} + \$_{CX4b} + \$_{WX4b} + \$_{EX4b} \quad (47)$$

Potentiometers 324 and 325 are adjusted to represent the respective portions of the next increment of power transmitted from the Southern system to first and second locations in foreign system $X_4$. Therefore, the output signal of summing amplifier 326 represents $$\text{Cost}_{S-X4} = K_{4a} \text{Cost}_{S-X4a} + K_{4b} \text{Cost}_{S-X4b} \quad (48)$$

Equation 48 represents the incremental cost of power at the boundary of the integrated system for a transfer of power from the Southern system to foreign system $X_4$.

Similarly, the output signal of summing amplifier 328 represents $$\text{Cost}_{E-X2a} = \lambda_E + \$_{EX2a} + \$_{CX2a} \quad (49)$$

and the output signal of summing amplifier 329 represents $$\text{Cost}_{E-X2b} = \lambda_E + \$_{EX2b} + \$_{CX2b} \quad (50)$$

The output signal of summing amplifier 335, $$\text{Cost}_{E-X2} = K_{2a} \text{Cost}_{E-X2a} + K_{2b} \text{Cost}_{E-X2b} \quad (51)$$

represents the incremental cost of power at the boundary of the integrated system for a transfer of power from the Eastern system to foreign system $X_2$.

*Summary*

There has thus been described a novel computing apparatus for calculating the power generation requirements of an integrated power transmission system in order that said integrated system may be operated with minimum total cost, wherein a local computer is provided for each local system to calculate the required generation by each generating station thereof to satisfy the difference between the power consumption requirements, as represented by a first signal, and the interchange power received by the local system sources external thereto, as represented by a second signal, and to satisfy the condition that power be delivered to the load center of the local system at a common incremental cost by all generating stations thereof; wherein computing means is provided to calculate, for each peripheral system, the incremental cost of power at a corresponding predetermined location for a transfer of power from the peripheral system to the reference system, wherein said power is supplied by the peripheral system at the common incremental cost thereof; wherein computing means is provided to calculate, for each peripheral system, the incremental cost of power at said corresponding predetermined location for a transfer of power from the peripheral system to the reference system so as to be received at the reference system at the common incremental cost thereof; and wherein comparing means is provided for comparing the two incremental costs calculated for each of the peripheral systems and in response to a difference between any two costs so compared to alter the value of the second signal of the corresponding peripheral system, whereupon a readjustment of the common incremental costs of the corresponding peripheral system and the reference system occurs so that said difference between the incremental costs compared is reduced, resulting in corresponding readjustments in calculated generating station requirements. The computing apparatus is further adapted to provide signals representing the incremental cost of wheeling power through a local system of the integrated system when power is transferred between two locations in the integrated system external to this local system; to provide signals representing the power transmitted on each tie line of the integrated system; and to provide signals representing the incremental cost of power exchanged between the integrated system and each foreign system connected thereto.

The embodiment of FIG. 6 computes, for an integrated power transmission system of $n$ local power transmission systems, $n-1$ pairs of incremental costs of power. Each pair is calculated on the basis of the hypothetical exchange of an increment of power between one of the peripheral systems and the reference system. From a comparison of the two values of each pair, a signal representing the interchange power of the corresponding peripheral system is controlled. The remaining reference system interchange power signal is derived from the $n-1$ peripheral system interchange power signals. It is within the scope of this invention to provide $n-1$ comparisons of pairs of incremental costs of power to control the local system interchange power signals without the necessity of selecting a reference system. Thus, instead of hypothesizing the exchange of an increment of power between a single local system and each of the other local systems, the $n-1$ pairs of incremental costs may be calculated on the bases of hypothetical exchanges of an increment of power between any $n-1$ different pairs of the local systems, provided that each local system is included at least once in these $n-1$ local system pairs. For each of these hypothetical exchanges a pair of incremental costs of power at a corresponding location in the integrated system is computed, the two values of each pair of costs being based respectively on the common incremental costs of power of the corresponding two local systems. The two values of each of the $n-1$ pairs of incremental costs are compared and the $n-1$ comparisons are used to control $n-1$ different interchange power signals.

For example, in the particular integrated system of FIG. 4, exchanges of an increment of power may be postulated between the Eastern and Southern systems, between the Central and Western systems, and between the Western and Southern systems. For the Eastern- Southern exchange the two incremental costs of power may be computed at the Eastern system boundary, for the Central-Western exchange the two incremental costs of power may be computed at the Western system boundary, and for the Western-Southern exchange the two incremental costs of power may be computed at the Southern system boundary. The Eastern interchange power signal may be controlled from the first pair of incremental costs of power, and the Central interchange power signal from the second pair. Since, for purposes of cost comparison, two interchanges of power were postulated for the Western system, one portion of the Western interchange power signal is obtained from the Central-Western comparison and the other portion from the Western-Southern comparison. A Southern-Western interchange power signal is controlled from the third pair of incremental costs of power and is added to the negative of the Central interchange power signal to obtain the Western interchange power signal. Similarly, the Southern interchange power signal is the negative sum of the Southern-to-Western and Eastern interchange power signals. Thus, the difference signal obtained from each hypothetical power exchange between two local systems is employed to control a signal representing the interchange power flowing between the two local systems. By combining the interchange power signals derived from all power exchanges postulated for a particular local system, the total interchange power signal for that local system is obtained.

This more general technique for automatically computing the interchange power requirements is demonstrated by considering the derivation of inter-area coordination Equations 22, which set forth the conditions for equating $n-1$ different pairs of incremental costs of power to obtain most economical operation of the integrated system. Each of Equations 22 is derived by expressing the term $P_{In}$ of $\psi_n$ in Equations 17 in terms of the other $n-1$ interchange powers; i.e., Equation 13. By so eliminating the $P_{In}$ terms, each of Equations 22 expresses a comparison based on the exchange of an increment of power between the $n^{th}$ local system and another local system. However, the $n-1$ Equations 22 may be obtained by expressing any one of the interchange power terms, $P_{Ik}$, in terms of the other $n-1$ interchange power terms, in accordance with Equation 13. For example, if in the second of Equations 17, the value $P_{Ia}$ of $\psi_a$ is expressed in terms of the other $n-1$ terms $P_{Ik}$, the corresponding one of Equations 22 will express a comparison of the values of incremental costs of power based on an exchange of power between the $a^{th}$ and $b^{th}$ local systems. Therefore, this interpretation of the derivation of Equations 22 illustrates the general technique of hypothesizing any $n-1$ different exchanges of power between two local systems as a basis for computing the corresponding incremental costs of power for comparison.

In the embodiment disclosed, the computing apparatus calculates the required generation of each system generating station. This computed generation is determined from appropriate meters, and the corresponding generating stations may be adjusted by the station operators in response to communications between the operator of the computing system and the station operators. However, it is within the scope of this invention to automatically adjust the generating station powers and the interchange powers in response to the signals generated by the embodiment of this invention. For example, each signal representing a generating station power, which is provided by a local computer, may be compared with a signal representing the actual output power of the corresponding generating station and by servomechanism means, such as are shown in the aforementioned U.S. Patent 2,839,692, the output power of the generating station may be automatically adjusted to conform to that calculated by the computing apparatus.

The computing apparatus of this invention is not limited in its application to calculating the economic operation of an integrated system employing only steam power generating stations. Instead, the principles of this invention are applicable to calculating the output of any system of generators, providing the outputs of at least a portion of the generators of the system are quantities which vary as functions of the incremental input rates.

While the principles of the invention have now been made clear in illustrative embodiments, there will be immediately obvious to those skilled in the art many modifications in structure, arrangement, proportions, the elements, materials, and components, used in the practice of the invention, and otherwise, which are particularly adapted for specific environments and operating requirements, without departing from those principles. The appended claims are therefore intended to cover and embrace any such modifications, within the limits only of the true spirit and scope of the invention.

What is claimed is:

1. Apparatus for computing the economic distribution of power of a plurality of local power transmission systems interconnected to form an integrated power transmission system, wherein each of said local systems is connected by at least one transmission path to exchange power with at least one other of said local systems, and wherein one of said local systems is designated as a reference system and the remainder of said local systems are designated as peripheral systems, comprising; means for providing a plurality of first signals representing respectively the incremental cost of power of a corresponding one of said local systems; a first computing means for each of said peripheral systems responsive to the corresponding first signal for computing for each of said transmission paths connected to said corresponding peripheral system the incremental cost of transmission losses in said peripheral system for transfer of power on said transmission path, said computation being based on the incremental cost of power represented by said corresponding first signal, said first computing means providing a plurality of second signals representing respectively the incremental cost of losses computed thereby; a second computing means for each of said peripheral systems responsive to the corresponding first signal and to the corresponding plurality of second signals for computing the corresponding incremental cost of power at a corresponding predetermined location in said integrated system for a transfer of power between the corresponding peripheral system and said reference system, said second computing means providing a third signal representing the incremental cost of power computed thereby; a third computing means responsive to the one of said first signals representing the incremental cost of power of said reference system for computing for each of said transmission paths connected to said reference system the incremental cost of transmission losses in said reference system for transfer of power on said transmission path, said computation being based on the incremental cost of power represented by said reference system first signal, said third computing means providing a plurality of fourth signals representing respectively the incremental cost of losses computed thereby; a fourth computing means for each of said peripheral systems responsive to said reference system first signal and to the corresponding ones of said fourth signals for computing the corresponding incremental cost of power at the corresponding one of said integrated system predetermined locations for a transfer of power between the corresponding peripheral system and said reference system, said fourth computing means providing a fifth signal representing the incremental cost of power computed thereby; a difference sensing means for each of said peripheral systems, each of said difference sensing means being connected to receive the corresponding one of said third signals and the corresponding one of said fifth signals, each of said difference sensing means providing a sixth signal representing the difference between the pair of signals received thereby; a first controllable interchange signal generator for each of said peripheral systems for delivering a respective seventh signal, each of said seventh signals representing the algebraic value of power delivered to said corresponding local system by the $n-1$ other local systems of said integrated system; means for coupling each of said sixth signals to the corresponding one of said first interchange signal generators to control the amplitude of the corresponding seventh signal, and a second interchange signal generator responsive to all of said seventh signals for delivering an eighth signal representing the algebraic value of power delivered to said reference system by said $n-1$ peripheral systems.

2. In combination with $n$ local computers employed for computing respectively the economic allocation of power of $n$ corresponding local power transmission systems, each of said local systems comprising a plurality of power sources, each of said local computers comprising means responsive to a first signal representing the desired total power to be consumed in said corresponding local system and a second signal representing the algebraic value of power delivered to said corresponding local system by power sources external thereto for computing the required power generation by each of said power sources of the corresponding local system for delivering power to a predetermined location in said corresponding local system at a common incremental cost, each of said local computers comprising further means for delivering a third signal representing said common incremental cost computed thereby and a plurality of fourth signals representing respectively said computed power generation of each of said power sources; apparatus for computing the economic distribution of generation required of said $n$ local systems when interconnected by a plurality of transmission paths to form an integrated power transmission system, wherein each of said local systems is connected by at least one of said transmission paths to exchange power with at least one other of said local systems, and wherein one of said local systems is designated as a reference system and the remaining $n-1$ of said local systems are designated as peripheral systems, comprising; a first computing means for each of said peripheral systems responsive to the third signal delivered by the corresponding peripheral system local computer and to a corresponding fifth signal for each of said transmission paths coupled to the corresponding peripheral system for computing the incremental cost of power at a corresponding predetermined location in said integrated system for a transfer of power between the corresponding peripheral system and said reference system when the incremental cost of said power transferred at said corresponding peripheral system is that represented by said corresponding third signal, said integrated system corresponding predetermined location comprising points on said transmission paths which interconnect said corresponding peripheral system and said reference system, said first computing means providing a sixth signal representing the incremental cost of power computed thereby, a second computing means for each of said peripheral systems responsive to the third signal delivered by the reference system local computer and to a corresponding fifth signal for each of said transmission paths coupled to said reference system for computing the incremental cost of power at said integrated system corresponding predetermined location for a transfer of power between the corresponding peripheral system and said reference system when the incremental cost of said power transferred at said reference system is that represented by said reference system third signal, said second computing means providing a seventh signal representing the incremental cost of power computed thereby; a difference sensing means for each of said peripheral systems, each of said difference sensing means connected to receive the corresponding one of said sixth signals and the corresponding one of said seventh signals, each of said difference sensing means providing an eighth signal representing the difference between the pair of signals received thereby; a first controllable interchange signal generator for each of said peripheral systems for delivering a respective one of said second signals, each of said second signals representing the algebraic value of power delivered to said corresponding local system by the $n-1$ other local systems of said integrated system; means for coupling each of said eighth signals to the corresponding one of said first interchange signal generators to alter the amplitude of the corresponding second signal in such a sense as to tend to reduce the magnitude of any difference existing between the pair of signals received by the corresponding one of said difference sensing means; a second interchange signal generator responsive to said second signals of all of said first interchange signal generators for delivering a second signal representing the algebraic value of power delivered to said reference system by said $n-1$ peripheral systems, and a third computing means responsive to said second signals of all of said first interchange signal generators and to said fourth signals delivered by all of said local computers for computing the power transferred on each of said transmission paths, said third computing means providing all of said fifth signals representing respectively each of the transmission path power transfers computed thereby.

3. In combination with $n$ local computers employed for computing respectively the economic allocation of power of $n$ corresponding local power transmission systems, each of said local systems comprising a plurality of power sources, each of said local computers comprising means responsive to a first signal representing the desired total power to be consumed in said corresponding local system and a second signal representing the algebraic value of power delivered to said corresponding local system by power sources external thereto for computing the required power generation by each of said power sources of the corresponding local system for delivering power to a predetermined location in said corresponding local system at a common incremental cost, each of said local computers comprising further means for delivering a third signal representing said common incremental cost computed thereby: apparatus for computing the economic distribution of generation required of said $n$ local systems when interconnected by a plurality of transmission paths to form an integrated power transmission system, wherein each of said local systems is connected by at least one of said transmission paths to exchange power with at least one other of said local systems, and wherein one of said local systems is designated as a reference system and the remaining $n-1$ of said local systems are designated as peripheral systems, comprising; a first computing means for each of said peripheral systems responsive to the third signal delivered by the corresponding peripheral system local computer for computing for each of said transmission paths connected to said corresponding peripheral system the incremental cost of transmission losses for transfer of an increment of power between said corresponding peripheral system and a predetermined point on said transmission path, said computation being based on the incremental cost of power represented by said corresponding third signal, said first computing means providing a plurality of fourth signals representing respectively the incremental cost of losses computed thereby; a second computing means for each of said peripheral systems responsive to the corresponding third signal and to the corresponding plurality of fourth signals for computing the corresponding incremental cost of power at a corresponding predetermined location in said integrated system for a transfer of power between the corresponding peripheral system and said reference system, said integrated system corresponding predetermined location comprising the corresponding ones of said predetermined points, said second computing means providing a fifth signal representing the incremental cost of power computed thereby; a third computing means responsive to the third signal delivered by the reference system local computer for computing for each of said transmission paths connected to said reference system the incremental cost of transmission losses for transfer of an increment of power between the corresponding one of said predetermined points and said reference system, said computation being based on the incremental cost of power represented by said reference system third signal, said third computing means providing a plurality of sixth signals representing respectively the incremental costs of losses computed thereby; a fourth computing means for each of said peripheral systems responsive to said reference system third signal and to the corresponding ones of said sixth signals for computing the corresponding incremental cost of power at said integrated system corresponding predetermined location for a transfer of power between the corresponding peripheral system and said reference system, said fourth computing means providing a seventh signal representing the incremental cost of power computed thereby; a difference sensing means for each of said peripheral systems, each of said difference sensing means connected to receive the corresponding one of said fifth signals and the corresponding one of said seventh signals, each of said difference sensing means providing an eighth signal representing the difference between the pair of signals received thereby; a first controllable interchange signal generator for each of said peripheral systems for delivering a respective one of said second signals, each of said second signals representing the algebraic value of power delivered to said corresponding local system by the $n-1$ other local systems of said integrated system; means for coupling each of said eighth signals to the corresponding one of said first interchange signal generators to alter the amplitude of the corresponding second signal in such a sense as to tend to reduce the magnitude of any difference existing between the pair of signals received by the corresponding one of said difference sensing means; and a second interchange signal generator responsive to said second signals of all of said first interchange signal generators for delivering a second signal representing the algebraic value of power delivered to said reference system by said $n-1$ peripheral systems.

4. In combination with $n$ local computers employed for computing respectively the economic allocation of power of $n$ corresponding local power transmission systems, each of said local systems comprising a plurality of power sources, each of said local computers comprising means responsive to a first signal representing the desired total power to be consumed in said corresponding local system and a second signal representing the algebraic value of power delivered to said corresponding local system by power sources external thereto for computing the required power generation by each of said power sources of the corresponding local system for delivering power to a predetermined location in said corresponding local system at a common incremental cost, each of said local computers comprising further means for delivering a third signal representing said common incremental cost computed thereby: apparatus for computing the economic distribution of generation required of said $n$ local systems when interconnected by a plurality of transmission paths to form an integrated power transmission system, wherein each of said local systems is connected by at least one of said transmission paths to exchange power with at least one other of said local systems, and wherein one of said local systems is designated as a reference system and the remaining $n-1$ of said local systems are designated as peripheral systems, comprising; a first computing means for each of said peripheral systems responsive to the third signal delivered by the corresponding peripheral system local computer for computing for each of said transmission paths connected to said corresponding peripheral system the incremental cost of transmission losses in said peripheral system for transfer of power on said transmission path, said computation being based on the incremental cost of power represented by said corresponding third signal, said first computing means providing a plurality of fourth signals representing respectively the incremental cost of losses computed thereby; a second computing means for each of said peripheral systems responsive to the corresponding third signal and to the corresponding plurality of fourth signals for computing the corresponding incremental cost of power at a corresponding predetermined location in said integrated system for a transfer of power between the corresponding peripheral system and said reference system, said second computing means providing a fifth signal representing the incremental cost of power computed thereby; a third computing means responsive to the third signal delivered by the reference system local computer for computing for each of said transmission paths connected to said reference system the incremental cost of transmission losses in said reference system for transfer of power on said transmission path, said computation being based on the incremental cost of power represented by said reference system third signal, said third computing means providing a plurality of sixth signals representing respectively the incremental costs of losses computed thereby; a fourth computing means for each of said peripheral systems responsive to said reference system third signal and to the corresponding ones of said sixth signals for computing the corresponding incremental cost of power at the corresponding one of said integrated system predetermined locations for a transfer of power between the corresponding peripheral system and said reference system, said fourth computing means providing a seventh signal representing the incremental cost of power computed thereby; a difference sensing means for each of said peripheral systems, each of said difference sensing means connected to receive the corresponding one of said fifth signals and the corresponding one of said seventh signals, each of said difference sensing means providing an eighth signal representing the difference between the pair of signals received thereby; a first controllable interchange signal generator for each of said peripheral systems for delivering a respective one of said second signals, each of said second signals representing the algebraic value of power delivered to said corresponding local system by the $n-1$ other local systems of said integrated system; means for coupling each of said eighth signals to the corresponding one of said first interchange signal generators to alter the amplitude of the corresponding second signal in such a sense as to tend to reduce the magnitude of any difference existing between the pair of signals received by the corresponding one of said difference sensing means; and a second interchange signal generator responsive to said second signals of all of said first interchange signal generators for delivering a second signal representing the algebraic value of power delivered to said reference system by said $n-1$ peripheral systems.

5. In combination with $n$ local computers employed for computing respectively the economic allocation of power of $n$ corresponding local power transmission systems, each of said local systems comprising a plurality of power sources, each of said local computers comprising means responsive to a first signal representing the desired total power to be consumed in said corresponding local system and a second signal representing the algebraic value of power delivered to said corresponding local system by power sources external thereto for computing the required power generation by each of said power sources of the corresponding local system for delivering power to a predetermined location in said corresponding local system at a common incremental cost, each of said local computers comprising further means for delivering a third signal representing said common incremental cost computed thereby and a plurality of fourth signals representing respectively said computed power generation of each of said power sources: apparatus for computing the economic distribution of generation required of said $n$ local systems when interconnected by a plurality of transmission paths to form an integrated power transmission system, wherein each of said local systems is connected by at least one of said transmission paths to exchange power with at least one other of said local systems, and wherein one of said local systems is designated as a reference system and the remaining $n-1$ of said local systems are designated as peripheral systems, comprising; a first computing means for each of said peripheral systems responsive to the third signal delivered by the corresponding peripheral system local computer and to a corresponding fifth signal for each of said transmission paths connected to said corresponding peripheral system for computing for each of said transmission paths connected to said corresponding peripheral system the incremental cost of transmission losses for transfer of power between said corresponding peripheral system and a predetermined point on said transmission path, said computation being based on the incremental cost of power represented by said corresponding third signal, said first computing means providing a plurality of sixth signals representing respectively the incremental cost of losses computed thereby, a second computing means for each of said peripheral systems responsive to the corresponding third signal and to the corresponding plurality of sixth signals for computing the corresponding incremental cost of power at a corresponding predetermined location in said integrated system for a transfer of power between the corresponding peripheral system and said reference system, said integrated system corresponding predetermined location comprising the corresponding ones of said predetermined points, said second computing means providing a seventh signal representing the incremental cost of power computed thereby; a third computing means responsive to the third signal delivered by the reference system local computer and to a corresponding fifth signal for each of said transmission paths connected to said reference system for computing for each of said transmission paths connected to said reference system the incremental cost of transmission losses for transfer of power between the corresponding one of said predetermined points and said reference system, said computation being based on the incremental cost of power represented by said reference system third signal, said third computing means providing a plurality of eighth signals representing respectively the incremental cost of losses computed thereby; a fourth computing means for each of said peripheral systems responsive to said reference system third signal and to the corresponding ones of said eighth signals for computing the corresponding incremental cost of power at said integrated system corresponding predetermined location for a transfer of power between the corresponding peripheral system and said reference system, said fourth computing means providing a ninth signal representing the incremental cost of power computed thereby; a difference sensing means for each of said peripheral systems, each of said difference sensing means being adapted to receive the corresponding one of said seventh signals and the corresponding one of said ninth signals, each of said difference sensing means being further adapted to provide a tenth signal representing the difference between the pair of signals received thereby; a first controllable interchange generator for each of said peripheral systems for delivering a respective one of said second signals, each of said second signals representing the algebraic value of power delivered to said corresponding local system by the $n-1$ other local systems of said integrated system; means for coupling each of tenth signals to the corresponding one of said first interchange signal generators to alter the amplitude of the corresponding second signal in such a sense as to tend to reduce the magnitude of any difference existing between the pair of signals received by the corresponding one of said difference sensing means; a second interchange signal generator responsive to said second signals of all of said first interchange of signal generators for delivering a second signal representing the algebraic value of power delivered to said reference system by said $n-1$ peripheral systems; and a fifth computing means responsive to said second signals of all of said first interchange signal generators and to said fourth signals delivered by all of said local computers for computing the power transferred on each of said transmission paths, said fifth computing means providing all of said fifth signals representing respectively each of the transmission path power transfers computed thereby.

6. Apparatus for computing the economic distribution of generation required of a pair of local power transmission systems connected together by a transmission network to exchange power, each of said local systems comprising a plurality of power sources: comprising a first controllable signal generating means for each of said local systems for providing a first signal representing a common incremental cost of power received at a predetermined location in the corresponding local system; a first computing means for each of said local systems responsive to the corresponding first signal for computing the required power generation by each of the corresponding power sources for delivery of power to said corresponding predetermined location at said common incremental cost, said first computing means providing a plurality of signals representing respectively the quantity of power generation computed for each of the corresponding power sources; a summing means for each of said local systems responsive to said plurality of signals provided by the corresponding first computing means for delivering a second signal representing the total power generated by all of the corresponding power sources; a first difference sensing means for each of said local systems for receiving (a) the corresponding second signal, (b) a third signal representing the algebraic value of power delivered to said corresponding local system by power sources external thereto, and (c) a fourth signal representing the desired total power to be consumed in said corresponding local system, said first difference sensing means providing a first difference signal representing the difference between said fourth signal and the sum of said second and third signals; means for each of said local systems for coupling the corresponding one of said first difference signals to the corresponding first signal generating means to alter the amplitude of the first signal provided thereby in such a sense that the responsively changing second signal tends to reduce the magnitude of said corresponding first difference signal; a second computing means for each of said local systems responsive to the corresponding first signal for computing the incremental cost of power at a predetermined location in said transmission network for a transfer of power between said local systems, the incremental cost of power at the corresponding local system in said transfer being that represented by said corresponding first signal, said second computing means providing a fifth signal representing the incremental cost of power computed thereby; a second difference sensing means for receiving the pair of fifth signals provided by said pair of second computing means for providing a second difference signal representing the difference between the pair of signals received thereby; a second controllable signal generating means for each of said local systems for providing the respective one of said third signals; and means for coupling said second difference signal to each of said second signal generating means to alter the amplitude of the corresponding third signal in such a sense as to tend to reduce the magnitude of any difference existing between said pair of fifth signals.

7. In combination with three local computers employed for computing respectively the economic allocation of power of three corresponding local power transmission systems, each of said local systems comprising a plurality of power sources, each of said local computers comprising means responsive to a first signal representing the desired total power to be consumed in the corresponding local system and a second signal representing the algebraic value of power delivered to said corresponding local system by power sources external thereto for computing the required power generation by each of said power sources of the corresponding local system for delivering power to a predetermined location in said corresponding local system at a common incremental cost, each of said local computers comprising further means for delivering a third signal representing said common incremental cost computer thereby: apparatus for computing the economic distribution of generation required of said local systems when each of said local systems is connected by a respective transmission path to each of the other two of said local systems for exchange of power therewith, comprising; a first computing means for each of the first and second of said local systems responsive to the third signal delivered by the corresponding local computer for computing the incremental cost of transmission losses in the corresponding local systems for a transfer of power between said corresponding local system and the third of said local systems, said computation being based on the incremental cost of power represented by said corresponding third signal, said first computing means providing a fourth signal representing the incremental cost of losses computed thereby; a second computing means for each of said first and second local systems responsive to the corresponding third signal for computing the incremental cost of wheeling losses for transfer of power through the corresponding local system when power is transferred between the other two of said local systems, said computation being based on the incremental cost of power represented by said corresponding third signal, said second computing means providing a fifth signal representing the incremental cost of wheeling losses computed thereby; a third computing means for each of said first and second local systems responsive to the corresponding third signal, to the corresponding fourth signal and to the fifth signal provided by the second computing means corresponding to the other one of said first and second local systems for computing the corresponding incremental cost of power at the boundary of said third local system for a transfer of power between the corresponding local system and said third local system, said third computing means providing a sixth signal representing the incremental cost of power computed thereby; a fourth computing means for each of said first and second local systems responsive to the third signal delivered by the third local system local computer for computing the incremental cost of power at said boundary for transfer of power between the corresponding one of said first and second local systems and said third local system, said computation being based on the incremental cost of power represented by said third local system third signal, said fourth computing means providing a seventh signal representing the incremental cost of power computed thereby; a difference sensing means for each of said first and second local systems, each of said difference sensing means connected to receive the corresponding one of said sixth signals and the corresponding one of said seventh signals, each of said difference sensing means providing an eighth signal representing the difference between the pair of signals received thereby; a controllable interchange signal generator for each of said first and second local systems for delivering the respective one of said second signals, each of said second signals representing the algebraic value of power delivered to the corresponding local system by the other two of said local systems; means for coupling each of said eighth signals to the corresponding one of said interchange signal generators to alter the amplitude of the corresponding second signal in such a sense as to tend to reduce the magnitude of any difference existing between the pair of signals received by the corresponding one of said difference sensing means; and means responsive to the pair of second signals provided by both of said interchange generators for generating said second signal received by the local computer of said third local system.

8. In combination with three local computers employed for computing respectively the economic allocation of power of three corresponding local power transmission systems, each of said local systems comprising a plurality of power sources, each of said local computers comprising means responsive to a first signal representing the desired total power to be consumed in the corresponding local system and a second signal representing the algebraic value of power delivered to said corresponding local system by power sources external thereto for computing the required power generation by each of said power sources of the corresponding local system for delivering power to a predetermined location in said corresponding local system at a common incremental cost, each of said local computers comprising further means for delivering a third signal representing said common incremental cost computed thereby: apparatus for computing the economic distribution of generation required of said local systems when each of said local systems is connected by a respective transmission path to each of the other two of said local systems for exchange of power therewith to form an integrated power transmission system, comprising; a first computing means for each of the first and second of said local systems responsive to the third signal delivered by the corresponding local computer for computing the incremental cost of transmission losses in the corresponding local system for a transfer of power between said corresponding local system and the third of said local systems, said computation being based on the incremental cost of power represented by said corresponding third signal, said first computing means providing a fourth signal representing the incremental cost of losses computed thereby; a second computing means for each of said first and second local systems responsive to the corresponding third signal for computing the incremental cost of wheeling losses for transfer of power through the corresponding local system when power is transferred between the other two of said local systems, said computation being based on the incremental cost of power represented by said corresponding third signal, said second computing means providing a fifth signal representing the incremental cost of wheeling losses computed thereby; a third computing means for each of said first and second local systems responsive to the corresponding third signal, to the corresponding fourth signal, and to the fifth signal provided by the second computing means corresponding to the other one of said first and second local systems for computing the corresponding incremental cost of power at the boundary of said third local system for a transfer of power between the corresponding local system and said third local system, said third computing means providing a sixth signal representing the incremental cost of power computed thereby; a fourth computing means for each of said first and second local systems responsive to the third signal delivered by the third local system local computer for computing the incremental cost of power at said boundary for transfer of power between the corresponding one of said first and second local systems and said third local system, said computation being based on the incremental cost of power represented by said third local system third signal, said fourth computing means providing a seventh signal representing the incremental cost of power computed thereby; a difference sensing means for each of said first and second local systems, each of said difference sensing means connected to receive the corresponding one of said sixth signals and the corresponding one of said seventh signals, each of said difference sensing means providing an eighth signal representing the difference between the pair of signals received thereby; a controllable interchange signal generator for each of said first and second local systems for delivering the respective one of said second signals, each of said second signals representing the algebraic value of power delivered to the corresponding local system by the other two of said local systems; means for coupling each of said eighth signals to the corresponding one of said interchange signal generators to alter the amplitude of the corresponding second signal in such a sense as to tend to reduce the magnitude of any difference existing between the pair of signals received by the corresponding one of said difference sensing means; and a summing means for receiving the pair of second signals provided by both of said interchange generators and in response thereto for delivering an output signal representing the negative sum of the second signals received thereby, whereby said summing means output signal comprises said second signal received by the local computer of said third local system.

9. In combination with three local computers employed for computing respectively the economic allocation of power of three corresponding local power transmission systems, each of said local systems comprising a plurality of power sources, each of said local computers comprising means responsive to a first signal representing the desired total power to be consumed in the corresponding local system and a second signal representing the algebraic value of power delivered to said corresponding local system by power sources external thereto for computing the required power generation by each of said power sources of the corresponding local system for delivering power to a predetermined location in said corresponding local system at a common incremental cost, each of said local computers comprising means for delivering a third signal representing said common incremental cost computed thereby: apparatus for computing the economic distribution of generation required of said local systems when each of said local systems is connected by a respective transmission path to each of the other two of said local systems for exchange of power therewith, a respective point on each of said transmission paths being designated as a computation point, comprising; a first computing means for each of the first and second of said local systems responsive to the third signal delivered by the corresponding local computer for computing for each of said transmission paths connected to the corresponding local system the incremental cost of transmission losses for transfer of an increment of power between said corresponding local system and the computation point on said transmission path, said computation being based on the incremental cost of power represented by said corresponding third signal, said first computing means providing a pair of fourth signals representing respectively the incremental cost of losses computed thereby; a second computing means for each of said first and second local systems responsive to the corresponding third signal for computing the incremental cost of wheeling losses for transfer of power between the computation points on the pair of transmission paths connected to the corresponding local system through the corresponding local system when power is transferred between the other two of said local systems, said computation being based on the incremental cost of power represented by said corresponding third signal, said second computing means providing a fifth signal representing the incremental cost of wheeling losses computed thereby; a third computing means for each of said first and second local systems responsive to the corresponding third signal, to the corresponding pair of fourth signals, and to the fifth signal provided by the second computing means corresponding to the other one of said first and second local systems for computing the corresponding incremental cost of power at a second predetermined location for a transfer of power between the corresponding local system and said third local system, said second predetermined location comprising the pair of said computation points on the pair of transmission paths connected to said third local system, said third computing means providing a sixth signal representing the incremental cost of power computed thereby; a fourth computing means responsive to the third signal delivered by the third signal delivered by the third local system local computer for computing for each of said transmission paths connected to said third local system the incremental cost of transmission losses for transfer of an increment of power between the corresponding one of said computation points and said third local system, said computation being based on the incremental cost of power represented by said third local system third signal, said fourth computing means providing a pair of seventh signals representing respectively the incremental cost of losses computed thereby; a fifth computing means for each of said first and second local systems responsive to said third local system third signal and to said pair of seventh signals for computing the corresponding incremental cost of power at said second predetermined location for a transfer of power between the corresponding one of said first and second local systems and said third local system, said fifth computing means providing an eighth signal representing the incremental cost of power computed thereby; a difference sensing means for each of said first and second local systems, each of said difference sensing means connected to receive the corresponding one of said sixth signals and the corresponding one of said eighth signals, each of said difference sensing means providing a ninth signal representing the difference between the pair of signals received thereby; a controllable interchange signal generator for each of said first and second local systems for delivering the respective one of said second signals, each of said second signals representing the algebraic value of power delivered to the corresponding local system by the other two of said local systems; means for coupling each of said ninth signals to the corresponding one of said interchange signal generators to alter the amplitude of the corresponding second signal in such a sense as to tend to reduce the magnitude of any difference existing between the pair of signals received by the corresponding one of said difference sensing means; and means responsive to the pair of second signals provided by both of said interchange signal generators for generating said second signal received by the local computer of said third local system.

10. In combination with three local computers employed for computing respectively the economic allocation of power of three corresponding local power transmission systems, each of said local systems comprising a plurality of power sources, each of said local computers comprising means responsive to a first signal representing the desired total power to be consumed in the corresponding local system and a second signal representing the algebraic value of power delivered to said corresponding local system by power sources external thereto for computing the required power generation by each of said power sources of the corresponding local system for delivering power to a predetermined location in said corresponding local system at a common incremental cost, each of said local computers comprising further means for delivering a third signal representing said common incremental cost computed thereby: apparatus for computing the economic distribution of generation required of said local systems when each of said local systems is connected by a respective transmission path to each of the other two of said local systems for exchange of power therewith to form an integrated power transmission system, a respective point on each of said transmission paths being designated as a computation point, comprising; a first computing means for each of the first and second of said local systems responsive to the third signal delivered by the corresponding local computer for computing for each of said transmission paths connected to the corresponding local system the incremental cost of transmission losses for transfer of an increment of power between said corresponding local system and the computation point on said transmission path, said computation being based on the incremental cost of power represented by said corresponding third signal, said first computing means providing a pair of fourth signals representing respectively the incremental cost of losses computed thereby; a second computing means for each of said first and second local systems responsive to the corresponding third signal for computing the incremental cost of wheeling losses for transfer of power between the computation points on the pair of transmission paths connected to the corresponding local system through the corresponding local system when power is transferred between the other two of said local systems, said computation being based on the incremental cost of power represented by said corresponding third signal, said second computing means providing a fifth signal representing the incremental cost of wheeling losses computed thereby; a third computing means for each of said first and second local systems responsive to the corresponding third signal, to the corresponding pair of fourth signals, and to the fifth signal provided by the second computing means corresponding to the other one of said first and second local systems for computing the corresponding incremental cost of power at a predetermined location in said integrated system for a transfer of power between the corresponding local system and said third local system, said integrated system corresponding predetermined location comprising the pair of said computation points on the pair of transmission paths connected to said third local system, said third computing means providing a sixth signal representing the incremental cost of power computed thereby; a fourth computing means responsive to the third signal delivered by the third local system local computer for computing for each of said transmission paths connected to said third local system the incremental cost of transmission losses for transfer of an increment of power between the corresponding one of said computation points and said third local system, said computation being based on the incremental cost of power represented by said third local system third signal, said fourth computing means providing a pair of seventh signals representing respectively the incremental cost of losses computed thereby; a fifth computing means for each of said first and second local systems responsive to said third local system third signal and to the corresponding pair of said seventh signals for computing the corresponding incremental cost of power at said integrated system predetermined location for a transfer of power between the corresponding one of said first and second local systems and said third local system, said fifth computing means providing an eighth signal representing the incremental cost of power computed thereby; a difference sensing means for each of said first and second local systems, each of said difference sensing means connected to receive the corresponding one of said sixth signals and the corresponding one of said eighth signals, each of said difference sensing means providing a ninth signal representing the difference between the pair of signals received thereby; a controllable interchange signal generator for each of said first and second local systems for delivering the respective one of said second signals, each of said second signals representing the algebraic value of power delivered to the corresponding local system by the other two of said local systems; means for coupling each of said ninth signals to the corresponding one of said interchange signal generators to alter the amplitude of the corresponding second signal in such a sense as to tend to reduce the magnitude of any difference existing between the pair of signals received by the corresponding one of said difference sensing means; and a summing means for receiving the pair of second signals provided by both of said interchange signal generators and in response thereto for delivering an output signal representing the negative sum of the second signals received thereby, whereby said summing means output signal comprises said second signal received by the local computer of said third local system.

References Cited in the file of this patent

UNITED STATES PATENTS

| | | |
|---|---|---|
| 2,793,335 | Woodruff | May 21, 1957 |
| 2,854,191 | Raisbeck | Sept. 30, 1958 |
| 2,861,197 | Brownlee | Nov. 18, 1958 |
| 2,897,476 | Widess | July 28, 1959 |

UNITED STATES PATENT OFFICE
CERTIFICATE OF CORRECTION

Patent No. 3,117,221 January 7, 1964

Leon K. Kirchmayer

It is hereby certified that error appears in the above numbered patent requiring correction and that the said Letters Patent should read as corrected below.

Column 45, line 39, after "comprising" insert -- further --.

Signed and sealed this 30th day of June 1964.

(SEAL)
Attest:

ERNEST W. SWIDER
Attesting Officer

EDWARD J. BRENNER
Commissioner of Patents